United States Patent
Takeda et al.

(10) Patent No.: US 12,557,017 B2
(45) Date of Patent: Feb. 17, 2026

(54) SECONDARY CELL DORMANCY FOR CROSS-CARRIER SCHEDULING FROM A SECONDARY CELL

(71) Applicant: QUALCOMM Incorporated, San Diego, CA (US)

(72) Inventors: Kazuki Takeda, Tokyo (JP); Huilin Xu, Temecula, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 420 days.

(21) Appl. No.: 17/732,278

(22) Filed: Apr. 28, 2022

(65) Prior Publication Data

US 2022/0361107 A1 Nov. 10, 2022

Related U.S. Application Data

(60) Provisional application No. 63/184,626, filed on May 5, 2021.

(51) Int. Cl.
*H04W 52/02* (2009.01)
*H04W 72/1263* (2023.01)
*H04W 72/23* (2023.01)

(52) U.S. Cl.
CPC ... *H04W 52/0235* (2013.01); *H04W 52/0274* (2013.01); *H04W 72/1263* (2013.01); *H04W 72/23* (2023.01)

(58) Field of Classification Search
None
See application file for complete search history.

(56) References Cited

U.S. PATENT DOCUMENTS

2015/0208269 A1\* 7/2015 Damnjanovic ....... H04L 5/0098
370/252
2015/0215929 A1 7/2015 Damnjanovic et al.
2016/0301556 A1\* 10/2016 Nory .................. H04L 27/2613
(Continued)

FOREIGN PATENT DOCUMENTS

WO WO-2015108636 A2 7/2015
WO WO-2021066331 A1 4/2021

OTHER PUBLICATIONS

International Search Report and Written Opinion—PCT/US2022/027090—ISA/EPO—Jul. 26, 2022.

*Primary Examiner* — Suhail Khan
(74) *Attorney, Agent, or Firm* — Holland & Hart LLP

(57) ABSTRACT

Methods, systems, and devices for wireless communications are described. A user equipment (UE) may receive a configuration for bandwidth parts of a plurality of cells that include at least a primary cell and a secondary cell, where the secondary cell supports cross carrier scheduling. The UE may monitor a first set of downlink control channel candidates on the secondary cell for a downlink control information message for at least one cell of the plurality of cells. The UE may receive, on the secondary cell based at least in part on monitoring the first set of downlink control channel candidates, the downlink control information message that includes a dormancy state indication for the at least one cell of the plurality of cells. The UE may communicate on active bandwidth parts of the plurality of cells based at least in part on the dormancy state indication for the at least one cell.

23 Claims, 17 Drawing Sheets

(56) References Cited

U.S. PATENT DOCUMENTS

| | | | |
|---|---|---|---|
| 2019/0124558 A1* | 4/2019 | Ang | H04L 5/001 |
| 2020/0229081 A1 | 7/2020 | Ang et al. | |
| 2022/0030659 A1* | 1/2022 | Kim | H04W 80/02 |
| 2022/0159700 A1* | 5/2022 | Maleki | H04W 72/23 |
| 2022/0264448 A1* | 8/2022 | Gonuguntla | H04L 5/0032 |
| 2023/0164771 A1* | 5/2023 | Liu | H04L 5/0053 |
| | | | 370/329 |

* cited by examiner

SECONDARY CELL DORMANCY FOR CROSS-CARRIER SCHEDULING FROM A SECONDARY CELL

CROSS REFERENCE

The present application for patent claims the benefit of U.S. Provisional Patent Application No. 63/184,626 by TAKEDA et al., entitled "SECONDARY CELL DORMANCY FOR CROSS-CARRIER SCHEDULING FROM A SECONDARY CELL," filed May 5, 2021, assigned to the assignee hereof, and expressly incorporated by reference herein.

FIELD OF TECHNOLOGY

The present disclosure relates to wireless communications, including secondary cell dormancy for cross-carrier scheduling from a secondary cell.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may be configured with one or more primary cells (PCells) and one or more secondary cells (SCells) in a wireless communications system. A base station may configure the PCells and SCells at the UE. The UE may use both cells for communications. In some cases, communications in one of the PCells or SCells may be scheduled by another of the PSCells or SCells, which may be referred to as cross-carrier scheduling. In some examples, the wireless communications system may support dormancy behavior for an SCell. When an SCell is dormant, the UE may not perform uplink communications, monitor a physical downlink control channel (PDCCH), among other behaviors, in order to conserve power.

SUMMARY

The described techniques relate to improved methods, systems, devices, and apparatuses that support secondary cell dormancy for cross-carrier scheduling from a secondary cell. Generally, the described techniques provide for supporting dormancy indications by secondary cells in a cross-carrier scheduling scenario. A user equipment (UE) may receive control signaling identifying a configuration for bandwidth parts of a plurality of cells that include at least a primary cell and a secondary cell. The secondary cell supports cross carrier scheduling to at least the primary cell in accordance with the configuration. The UE may monitor a first set of downlink control channel candidates on the secondary cell for a downlink control information message for at least one cell of the plurality of cells. The UE may receive, on the secondary cell based at least in part on monitoring the first set of downlink control channel candidates, the downlink control information message that includes a dormancy state indication for the at least one cell of the plurality of cells. The UE may communicate on active bandwidth parts of the plurality of cells based at least in part on the dormancy state indication for the at least one cell.

The UE may also monitor a set of downlink control channel candidates on the primary cell for a fallback downlink control information message based at least in part on the secondary cell being associated with a dormant bandwidth part. The UE may receive on the primary cell, the fallback downlink control information message based at least in part on monitoring the set of downlink control candidates. The UE may also switch to an active bandwidth part on the secondary cell based at least in part on receiving the fallback downlink control information message.

A method for wireless communications at a user equipment (UE) is described. The method may include receiving, at the user equipment (UE), control signaling identifying a configuration for bandwidth parts of a set of multiple cells that include at least a primary cell and a secondary cell, where the secondary cell supports cross carrier scheduling to at least the primary cell in accordance with the configuration, monitoring a first set of downlink control channel candidates on the secondary cell for a downlink control information message for at least one cell of the set of multiple cells, receiving, on the secondary cell based on monitoring the first set of downlink control channel candidates, the downlink control information message that includes a dormancy state indication for the at least one cell of the set of multiple cells, and communicating on active bandwidth parts of the set of multiple cells based on the dormancy state indication for the at least one cell.

An apparatus for wireless communications at a user equipment (UE) is described. The apparatus may include a processor, memory coupled with the processor, and instructions stored in the memory. The instructions may be executable by the processor to cause the apparatus to receive, at the UE, control signaling identifying a configuration for bandwidth parts of a set of multiple cells that include at least a primary cell and a secondary cell, where the secondary cell supports cross carrier scheduling to at least the primary cell in accordance with the configuration, monitor a first set of downlink control channel candidates on the secondary cell for a downlink control information message for at least one cell of the set of multiple cells, receive, on the secondary cell based on monitoring the first set of downlink control channel candidates, the downlink control information message that includes a dormancy state indication for the at least one cell of the set of multiple cells, and communicate on active bandwidth parts of the set of multiple cells based on the dormancy state indication for the at least one cell.

Another apparatus for wireless communications at a user equipment (UE) is described. The apparatus may include means for receiving, at the UE, control signaling identifying a configuration for bandwidth parts of a set of multiple cells that include at least a primary cell and a secondary cell, where the secondary cell supports cross carrier scheduling to at least the primary cell in accordance with the configuration, means for monitoring a first set of downlink control channel candidates on the secondary cell for a downlink control information message for at least one cell of the set of multiple cells, means for receiving, on the secondary cell based on monitoring the first set of downlink control channel candidates, the downlink control information message that includes a dormancy state indication for the at least one cell of the set of multiple cells, and means for communicating on active bandwidth parts of the set of multiple cells based on the dormancy state indication for the at least one cell.

A non-transitory computer-readable medium storing code for wireless communications at a user equipment (UE) is described. The code may include instructions executable by a processor to receive, at the UE, control signaling identifying a configuration for bandwidth parts of a set of multiple cells that include at least a primary cell and a secondary cell, where the secondary cell supports cross carrier scheduling to at least the primary cell in accordance with the configuration, monitor a first set of downlink control channel candidates on the secondary cell for a downlink control information message for at least one cell of the set of multiple cells, receive, on the secondary cell based on monitoring the first set of downlink control channel candidates, the downlink control information message that includes a dormancy state indication for the at least one cell of the set of multiple cells, and communicate on active bandwidth parts of the set of multiple cells based on the dormancy state indication for the at least one cell.

Some examples of the method, apparatuses, and non-transitory computer-readable medium described herein may further include operations, features, means, or instructions for determining that the downlink control information message includes the dormancy state indication based on a value of a cell indicator field of the downlink control information message.

Some examples of the method, apparatuses, and non-transitory computer-readable medium described herein may further include operations, features, means, or instructions for receiving an indication of a downlink control configuration that specifies that the dormancy state indication is to be included in downlink control information messages that schedule a cell associated with the value of the cell indicator field, where the UE determines the downlink control information message includes the dormancy state indication based on the received downlink control configuration.

Some examples of the method, apparatuses, and non-transitory computer-readable medium described herein may further include operations, features, means, or instructions for monitoring a second set of downlink control channel candidates of a UE specific search space on the primary cell for a second downlink control information message and receiving, based on monitoring the second set of downlink control channel candidates, the second downlink control information message including the dormancy state indication for the at least one cell.

Some examples of the method, apparatuses, and non-transitory computer-readable medium described herein may further include operations, features, means, or instructions for determining that the second downlink control information message includes a value of a cell indicator field of zero, or a same value that may be included in the cell indicator field of the first downlink control information message.

Some examples of the method, apparatuses, and non-transitory computer-readable medium described herein may further include operations, features, means, or instructions for determining that the second downlink control information message lacks a cell indicator field based on the second downlink control information message being received on the primary cell.

Some examples of the method, apparatuses, and non-transitory computer-readable medium described herein may further include operations, features, means, or instructions for receiving a semi-static configuration that specifies that the secondary cell may be to transmit the downlink control information message that includes the dormancy state indication, where the first set of downlink control channel candidates may be monitored for the downlink control information message including the dormancy state indication based on the semi-static configuration.

Some examples of the method, apparatuses, and non-transitory computer-readable medium described herein may further include operations, features, means, or instructions for determining that the secondary cell may be associated with a dormant bandwidth part based on the dormancy indication, monitoring a second set of downlink control channel candidates on the primary cell for a fallback downlink control information message based on the secondary cell being associated with the dormant bandwidth part, receiving, on the primary cell, the fallback downlink control information message based on monitoring the second set of downlink control candidates, and switching to an active bandwidth part on the secondary cell based on receiving the fallback downlink control information message.

In some examples of the method, apparatuses, and non-transitory computer-readable medium described herein, receiving the fallback downlink control information message may include operations, features, means, or instructions for receiving the fallback downlink control information message that includes an indication to switch to the active bandwidth part on the secondary cell, where the UE switches to the active bandwidth part based on the indication.

In some examples of the method, apparatuses, and non-transitory computer-readable medium described herein, the non-fallback downlink control information message may be a downlink control information (DCI) format 1_1, or a DCI format 0_1, or a DCI format 1_2, or a DCI format 0_2 and the fallback downlink control information message may be a DCI format 1_0 or a DCI format 0_0.

In some examples of the method, apparatuses, and non-transitory computer-readable medium described herein, receiving the downlink control information message may include operations, features, means, or instructions for receiving the downlink control information message that schedules a resource for communication in the primary cell, the secondary cell, or another secondary cell of the set of multiple cells.

Some examples of the method, apparatuses, and non-transitory computer-readable medium described herein may further include operations, features, means, or instructions for performing blind decoding on the first set of downlink control channel candidates of a UE specific search space set of the secondary cell, where the downlink control information message may be received based on the blind decoding.

A method for wireless communications at a network node is described. The method may include transmitting, to a UE, control signaling identifying a configuration for bandwidth parts of a set of multiple cells that includes at least a primary cell and a secondary cell, where the secondary cell supports cross carrier scheduling of at least the primary cell in accordance with the configuration, transmitting, to the UE on the secondary cell, a downlink control information message that includes a dormancy state indication for at least one cell of the set of multiple cells, and communicating, with the UE, on active bandwidth parts of the set of multiple cells based on the dormancy state indication for the at least one cell.

An apparatus for wireless communications at a network node is described. The apparatus may include a processor, memory coupled with the processor, and instructions stored in the memory. The instructions may be executable by the processor to cause the apparatus to transmit, to a UE, control signaling identifying a configuration for bandwidth parts of a set of multiple cells that includes at least a primary cell and a secondary cell, where the secondary cell supports cross carrier scheduling of at least the primary cell in accordance with the configuration, transmit, to the UE on the secondary cell, a downlink control information message that includes a dormancy state indication for at least one cell of the set of multiple cells, and communicate, with the UE, on active bandwidth parts of the set of multiple cells based on the dormancy state indication for the at least one cell.

Another apparatus for wireless communications at a network node is described. The apparatus may include means for transmitting, to a UE, control signaling identifying a configuration for bandwidth parts of a set of multiple cells that includes at least a primary cell and a secondary cell, where the secondary cell supports cross carrier scheduling of at least the primary cell in accordance with the configuration, means for transmitting, to the UE on the secondary cell, a downlink control information message that includes a dormancy state indication for at least one cell of the set of multiple cells, and means for communicating, with the UE, on active bandwidth parts of the set of multiple cells based on the dormancy state indication for the at least one cell.

A non-transitory computer-readable medium storing code for wireless communications at a network node is described. The code may include instructions executable by a processor to transmit, to a UE, control signaling identifying a configuration for bandwidth parts of a set of multiple cells that includes at least a primary cell and a secondary cell, where the secondary cell supports cross carrier scheduling of at least the primary cell in accordance with the configuration, transmit, to the UE on the secondary cell, a downlink control information message that includes a dormancy state indication for at least one cell of the set of multiple cells, and communicate, with the UE, on active bandwidth parts of the set of multiple cells based on the dormancy state indication for the at least one cell.

Some examples of the method, apparatuses, and non-transitory computer-readable medium described herein may further include operations, features, means, or instructions for including the dormancy state indication in the downlink control information message based on a value of a cell indicator field of the downlink control information message.

Some examples of the method, apparatuses, and non-transitory computer-readable medium described herein may further include operations, features, means, or instructions for transmitting an indication of a downlink control configuration that specifies that the dormancy state indication is to be included in downlink control information messages that schedule a cell associated with the value of the cell indicator field, where the dormancy state indication may be included in the downlink control information message based on the downlink control configuration.

Some examples of the method, apparatuses, and non-transitory computer-readable medium described herein may further include operations, features, means, or instructions for transmitting, on the primary cell, a second downlink control information message including the dormancy state indication for the at least one cell.

Some examples of the method, apparatuses, and non-transitory computer-readable medium described herein may further include operations, features, means, or instructions for including, in the second downlink control information message, a value of a cell indicator field of zero, or a same value that may be included in the cell indicator field of the first downlink control information message based on the second downlink control information message including the dormancy state indication and being transmitted on the primary cell.

In some examples of the method, apparatuses, and non-transitory computer-readable medium described herein, transmitting the second downlink control information message may include operations, features, means, or instructions for transmitting the second downlink control information message without a cell indicator field based on the second downlink control information message including the dormancy state indication and being transmitted on the primary cell.

Some examples of the method, apparatuses, and non-transitory computer-readable medium described herein may further include operations, features, means, or instructions for transmitting, to the UE, a semi-static configuration that specifies that the secondary cell may be to transmit the downlink control information message that includes the dormancy state indication, where the downlink control information message including the dormancy state indication may be transmitted on the secondary cell based on the semi-static configuration.

Some examples of the method, apparatuses, and non-transitory computer-readable medium described herein may further include operations, features, means, or instructions for determining that the secondary cell may be associated with a dormant bandwidth part based on the dormancy indication, transmitting, on the primary cell, a fallback downlink control information message based on the secondary cell being associated with the dormant bandwidth part, and determining that the secondary cell may be switched to an active bandwidth part based on transmitting the fallback downlink control information message.

In some examples of the method, apparatuses, and non-transitory computer-readable medium described herein, transmitting the fallback downlink control information message may include operations, features, means, or instructions for transmitting the fallback downlink control information message that includes an indication to switch to the active bandwidth part on the secondary cell.

In some examples of the method, apparatuses, and non-transitory computer-readable medium described herein, the non-fallback downlink control information message may be a DCI format 1_1 or a DCI format 0_1 and the fallback downlink control information message may be a DCI format 1_0 or a DCI format 0_0.

In some examples of the method, apparatuses, and non-transitory computer-readable medium described herein, transmitting the downlink control information message may include operations, features, means, or instructions for transmitting the downlink control information message that schedules a resource for communication in the primary cell, the secondary cell, or another secondary cell of the set of multiple cells.

In some examples of the method, apparatuses, and non-transitory computer-readable medium described herein, transmitting the downlink control information message may include operations, features, means, or instructions for transmitting the downlink control information message in a UE specific search space set of the secondary cell.

DETAILED DESCRIPTION

Figure 1:
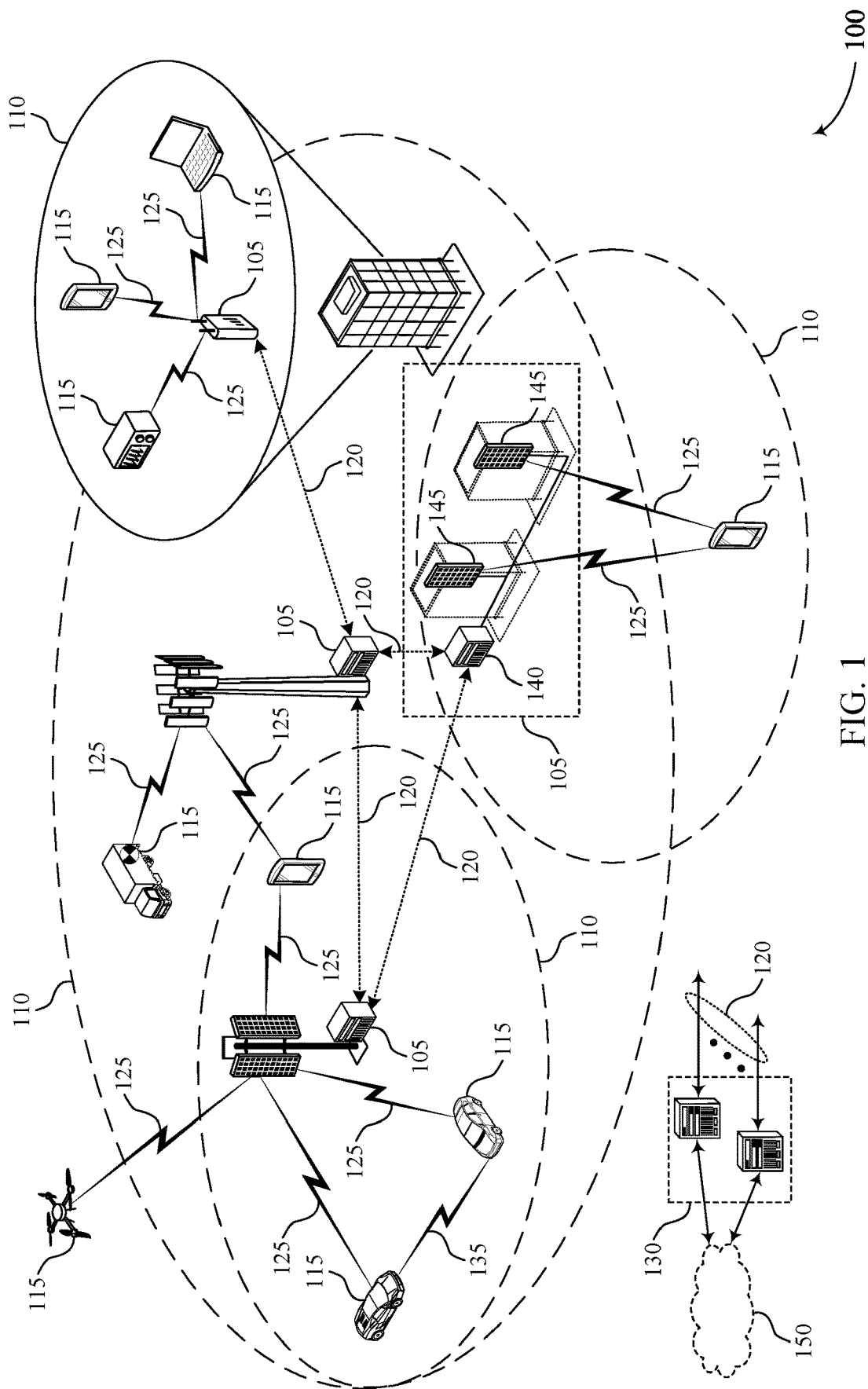
FIG. 1 illustrates an example of a wireless communications system that supports secondary cell dormancy for cross-carrier scheduling from a secondary cell in accordance with aspects of the present disclosure.

A base station and a user equipment (UE) may utilize one or more primary cells (PCells) and one or more secondary cells (SCells) for communications. In some cases, in order to offload some capacity from a PCell (e.g., in a dynamic spectrum sharing (DSS) scenario) an SCell may be configured to perform cross-carrier scheduling such that the SCell schedules communications on the PCell or on another SCell. Additionally, the wireless communications system may support SCell dormancy, and if an SCell is dormant, the UE may not perform uplink transmissions or monitor physical downlink control channels (PDCCHs) in the dormant SCell. SCell dormancy may support power conservation at the UE. Additionally, control signaling (e.g., downlink control information (DCI)) may support SCell dormancy indications. For example, a field in the DCI may include a bitmap, where each bit corresponds to a SCell group that is configured at the UE. In some examples, the SCell dormancy indications are carried by DCI types. Additionally, the SCell dormancy indications may be restricted to use by the PCell (or primary secondary cell (PSCell)). As such, scheduling DCIs transmitted by the SCell (e.g., for cross-carrier scheduling) may be restricted from carrying the dormancy indication. When a UE is configured with cross carrier scheduling from an SCell to the PCell, if the UE does not support or is not configured with monitoring of these DCIs on the PCell (or PSCell), then the dormancy indication for SCells may not be available.

Techniques described herein support dormancy indications by an SCell. According to one technique, if the UE is monitoring PDCCH candidates in SCells for scheduling DCIs, the UE expects that a decoded DCI is to include the dormancy indication field. In some cases, DCIs for particular scheduled cells (e.g., based on a cell indicator field (CIF)) are to have the dormancy indication field. In some cases, the ability of a SCell to transmit a DCI is configured at the UE via semi-static configurations.

In some cases, if the SCell is dormant, and thus the UE is not monitoring the PDCCH in the SCell, there may not be available DCI formats that support the dormancy indication and reactivate an SCell. According to another technique, the UE may monitor the PCell for DCI formats that schedule unicast data to the PCell to activate a bandwidth part (BWP) (enter a non-dormant state) on the SCell. In another case, the DCI formats may include an explicit indication to activate a BWP on the SCell. Thus, these techniques may support improved SCell dormancy indications in wireless communications systems and environments that support cross-carrier scheduling, which may result in improved communication efficiency, reliability, throughput, and reduced latency. These and other techniques are described in further detail with respect to the following figures.

Aspects of the disclosure are initially described in the context of wireless communications systems. Aspects of the disclosure are further described with respect to a wireless communications system, resource diagrams, and a process flow. Aspects of the disclosure are further illustrated by and described with reference to apparatus diagrams, system diagrams, and flowcharts that relate to secondary cell dormancy for cross-carrier scheduling from a secondary cell.

FIG. 1 illustrates an example of a wireless communications system 100 that supports secondary cell dormancy for cross-carrier scheduling from a secondary cell in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support communications via multiple cells in order to improve communication robustness and throughput. For example, a base station 105 may configure a UE 115 with one or more PCells (e.g., and a PSCell) and one or more SCells/SCell groups. In some examples, the PCells may coordinate communications in the SCells, and for a given scheduled cell, there may be one scheduling cell. However, PCell communication coordination on multiple SCells may be complex. For example, in the dynamic spectrum sharing (DSS) systems, a PCell may be configured as the DSS carrier and coordinate traffic between two or more radio access technologies (RATs), such as 5G/NR and LTE. As such, the wireless communications system 100 may support cross-carrier scheduling such that some of the control information capacity may be offloaded to one or more SCells. For example, an SCell configured at the UE 115 may allow the SCell to schedule communications on the PCell or one or more other SCells. In some cases, the SCell that is configured for cross-carrier scheduling may be referred to as a special SCell or scheduling SCell (sSCell).

The wireless communications system 100 may also support SCell dormancy. When an SCell is dormant (e.g., based on a configuration or indication to the UE 115), the UE 115 may not monitor for PDCCH transmissions on the SCell or perform uplink transmissions (including sounding reference signal (SRS) transmissions). The UE 115 may perform CSI measurement, AGC and beam management, and periodic or semi-persistent CSI reporting. However, the UE may not support aperiodic CSI reporting on a dormant cell. In some cases, the CSI may be measured on the SCell but reported on the PCell. These various dormancy behaviors may support power conservation at the UE 115, which may improve battery life, among other benefits.

SCell dormancy may be indicated using a DCI message. The DCI message may include a bitmap, where each bit corresponds to an SCell (SCell group) configured at the UE 115. In some cases, the SCell dormancy indication is restricted to use by the PCell, and scheduling DCIs transmitted by the SCell (e.g., for cross-carrier scheduling) may be restricted from carrying the dormancy indication. However, when a UE 115 is configured with cross-carrier scheduling from an SCell (e.g., sSCell) to the PCell, and if the UE 115 does not support or is not configured for monitoring of particular DCIs on the PCell, then the dormancy indication for SCells may not be available.

Techniques described herein support SCells transmitting DCIs with the dormancy indication for one or more SCells. According to techniques described herein, if a UE 115 is monitoring PDCCH candidates for scheduling DCIs in an SCell (e.g., sSCell), then the UE 115 115 may be configured to identify the dormancy indication in a decoded DCI. In some examples, the inclusion of a dormancy indication field carried by a DCI may be dependent on a cell that is scheduled by the DCI (e.g., based on a CIF in the DCI). In some examples, the ability of the SCell to transmit the DCI including the dormancy indication field may be configured at the UE 115 using semi-static configurations. Another technique described herein supports activation of a dormant SCell (e.g., activation of the dormant BWP of the SCell to a non-dormant BWP) based on a DCI transmitted by the PCell. This technique may be used when an SCell is dormant, and thus the UE 115 is not monitoring the PDCCH of the SCell. As such, there may not be available DCI formats that may transmit a dormancy indication to reactivate the SCell. Thus, the UE 115 may trigger activation of the dormant SCell when the UE 115 receives a DCI transmitted by the PCell. In some examples, the DCI may include a field that explicitly indicates that the UE 115 is to activate the SCell. These techniques may support improved communication reliability and efficiency by supporting SCell dormancy indications (e.g., by an SCell) in cross-carrier scheduling scenarios.

Figure 2:
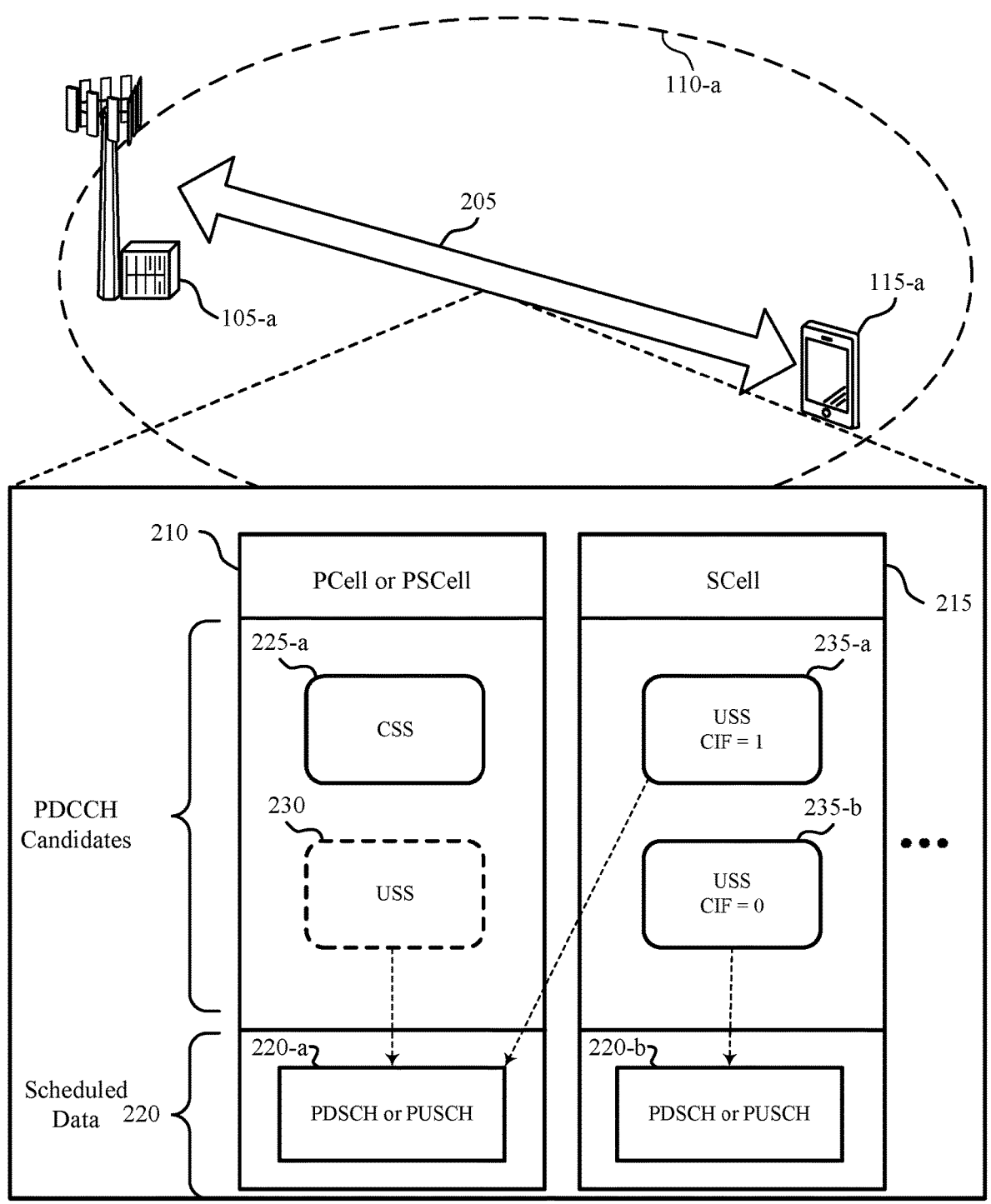
FIG. 2 illustrates an example of a wireless communications system that supports secondary cell dormancy for cross-carrier scheduling from a secondary cell in accordance with aspects of the present disclosure.

FIG. 2 illustrates an example of a wireless communications system 200 that supports secondary cell dormancy for cross-carrier scheduling from a secondary cell in accordance with aspects of the present disclosure. The wireless communications system 200 may include a base station 105-*a* and a UE 115-*a*, which may be examples of the corresponding devices described with respect to FIG. 1. The UE 115-*a* and the base station 105-*a* may communicate with each other in a geographic coverage area 110-*a* via various communication links 205 and using various cells. For example, the UE 115-*b* may be configured with (e.g., by the base station 105-*a* or another base station 105) with a PCell 210 (and/or PSCell) and a set of SCells (e.g., SCell 215). Each cell including PCell 210 and SCell 215 may correspond to various resources (e.g., time domain and frequency domain resources) that are used for communications on the respective cells. For example, each cell may be associated with a particular bandwidth part of a radio frequency bandwidth. In some cases, the PCell may correspond to a master cell group and the SCells (e.g., SCell 215) may correspond to a secondary cell group. The UE 115-*b* may be configured with the PCell 210 and the SCell 215 using various control messages, such as RRC signaling.

As described herein, the wireless communications system may support dormant BWP for SCells. When a BWP is dormant for an SCell, in the downlink, the UE 115-*a* may not monitor the PDCCH, may continue CSI measurement, may perform AGC and beam management, may support periodic and semi-persistent CSI reporting but not aperiodic CSI reporting. For a dormant BWP for a SCell, in the uplink, the UE 115-*a* may not perform uplink transmissions including SRS transmissions. To signal SCell dormancy, various DCI formats may be used. For example, a PDCCH wake up signal (WUS), which may be a DCI format 2_6, may be transmitted outside of a DRX active time. The DCI 2_6 (WUS) may be monitored on a type 3 common search space set (CSS). Additionally, the SCell dormancy may be signaled in a DCI 1_1 or 0_1 within a discontinuous reception (DRX) active time, and these DCI formats may be monitored on a UE specific search space set (USS). These signaling mechanisms for SCell dormancy may be available on the PCell 210 (or PSCell) and may not be available on the SCell 215 (or another SCell). The dormancy indication field of these DCIs may be a bitmap, where each bit corresponds to a particular dormancy status (e.g., active or dormant) for an SCell group.

In some cases, the wireless communications system 200 may support DSS such that multiple RATs are supported and may share the radiofrequency spectrum. In such cases, the PCell 210 may be configured as the DSS carrier. To offload communication requirements from the PCell 210, the SCell may be configured to perform cross-carrier scheduling. For example, DCI transmitted in the SCell 215 may schedule communications in the PCell 210, the SCell 215, or another SCell. For example, a DCI carried by the SCell 215 may schedule data 220-*a* (e.g., a physical downlink shared channel (PDSCH) or a physical uplink shared channel (PUSCH)) in the PCell 210 or data 220-*b* (e.g., a PDSCH or PUSCH) in the SCell 215.

The DCIs that schedule transmissions and include other information may be monitored for and decoded in PDCCH candidates of various search space sets. For example, the WUS may be monitored for in PDCCH candidates of a CSS 225-*a* of the PCell 210. Further, the DCIs (e.g., DCI formats 1_1 and 0_1) may be monitored for in PDCCH candidates in USS 230 of the PCell and/or the USSs 235 of the SCell. In some cases, the USS 230 may be optional. More particularly, the configuration of the USS 230 in the PCell 210 may be dependent on whether the UE 115-*a* supports such a configuration. Thus, if the UE 115-*a* does not support the USS 230 in the PCell, the USS 230 may not be configured. Additionally, the UE 115-*a* may not be configured with the USS 230 configuration when the UE 115-*a* supports such a configuration. In such cases, the scheduling DCIs 1_1 and 0_1 may not be available in the PCell 210. Thus, if the USS 230 is not configured at the UE 115-*a*, then the SCell dormancy indication field in the DCI 1_1 or 0_1 may not be available since this indication may be restricted to the PCell 210. This may result in a loss of power saving features supported by SCell dormancy configurations.

Techniques described herein support the utilization of dormancy indications (via DCI) in the SCells (e.g., SCell 215). Thus, DCI 2_6 (WUS) or DCI 1_1/0_1 with a dormancy indication field may be transmitted in the in the PCell 210 or the SCell 215. Implementations are described herein with respect to DCI 1_1 and 0_1, but it should be understood that the techniques may be applicable to DCI formats 1_2 or 0_2. As such, the UE 115-*a* may be configured to monitor for a DCI with a dormancy indication on some or all of the SCells 215 that are configured at the UE 115-*a*. In some cases, any DCI that schedules communications on another cell (e.g., DCI 1_1 or 0_1) may be configured to a to carry the dormancy indication field (and those are monitored for by the UE 115-*a*). In other cases, the DCIs that schedule particular cells are to include the dormancy indication field. In such cases, if the SCell 215 cross-carrier schedules data to other cells(s), the DCI 1_1/0_1 for particular scheduled cell(s) (e.g., for itself) or for particular CIF values (e.g., for CIF=0) are to have the dormancy indication field. For example, if the DCI is decoded from USS 235-*a* (e.g., CIF=1) and schedules data to the PCell 210, then this DCI may not include the dormancy indication field. However, if the DCI is decoded in USS 235-*b* (CIF=0) and thus schedules data in the SCell 215 itself, then the DCI may include the dormancy indication field. Additional examples of these techniques are further described with respect to the following figures.

In some cases, the SCells that may deliver the DCI with the SCell dormancy indication field may be semi-statically configured by a higher-layer (e.g., via the base station 105-*a*). For example, the base station 105-*a* may indicate to the UE 115-*a* that if the SCell cross-carrier schedules data to the other cell(s), the DCI 1_1/0_1 for any scheduled cell(s) have the SCell dormancy indication field or if the SCell cross-carrier schedules data to the other cell(s), the DCI 1_1/0_1 for particular scheduled cell(s) (e.g., for itself) or for particular CIF value(s) (e.g., for CIF=0) have the SCell dormancy indication field.

According to some implementations, the dormancy indication field may be available for the SCell that is configured for cross-carrier scheduling (e.g., SCell 215) but not for other SCells. In cases where the SCell 215 itself is indicated as dormant, then the dormancy indication field may not be available (e.g., when the USS 230 is not configured in the PCell 210). However, enabling SCell dormancy indication from multiple SCells may result in complexities.

Techniques described herein may leverage the DCI decoded in the CSS 225-*a* to activate a BWP for an SCell such that the BWP is non-dormant. In order to support SCell dormancy indication from the PCell 210 (or PSCell) even without DCI 1_1/0_1 (e.g., when USS 230 is not configured), support of a SCell dormancy indication may be implemented in a DCI 1_0/0_0 that is allocated to the CSS 225-*a* or the USS 230 (if configured) on the PCell 210 (or PSCell). The DCI 1_0/0_1 may be cyclic redundancy check (CRC) scrambled by C-RNTI or MCS-C-RNTI. The DCI 1_0/0_0 may be monitored on a CSS (e.g., CSS 225-*a*) or the USS 230 (if configured) on the PCell 210 (or PSCell). Due to the DCI formats 1_0/0_0 being monitored on the CSS 225-*a* and the USS 230 and the fields of the DCI formats 1_0/0_0 mostly not dependent on UE-specific configurations, these DCI formats may be referred to as fallback DCIs, while DCI formats 1_1 and 0_1 (as well as other DCI formats), which may be monitored in USSs and the fields mostly dependent on UE-specific configurations, may be referred to as non-fallback DCIs.

The fallback DCI formats 1_0/0_0 may not have the SCell dormancy indication field. However, according to techniques described herein, the UE 115-*a* may switch a to a non-dormant bandwidth part for a particular SCell upon receiving one of these DCI formats. In some cases, the particular SCell is the SCell 215 (e.g., sSCell) that is configured to perform cross-carrier scheduling of data to the PCell 210 (or PSCell) is dormant. Thus, if this particular SCell is dormant, then upon receipt of the fallback DCI formats, the UE 115-*a* may switch the BWP of the SCell 215 to an active (i.e., non-dormant) state. More particularly, reception of the DCI may implicitly indicate switching to the active state (e.g., a non-dormant BWP) in the SCell 215. In accordance with another technique, a field in the fallback DCI formats may indicate switching to a dormant BWP or non-dormant BWP explicitly. These techniques are described in further detail with respect to the following figures.

Figure 3:
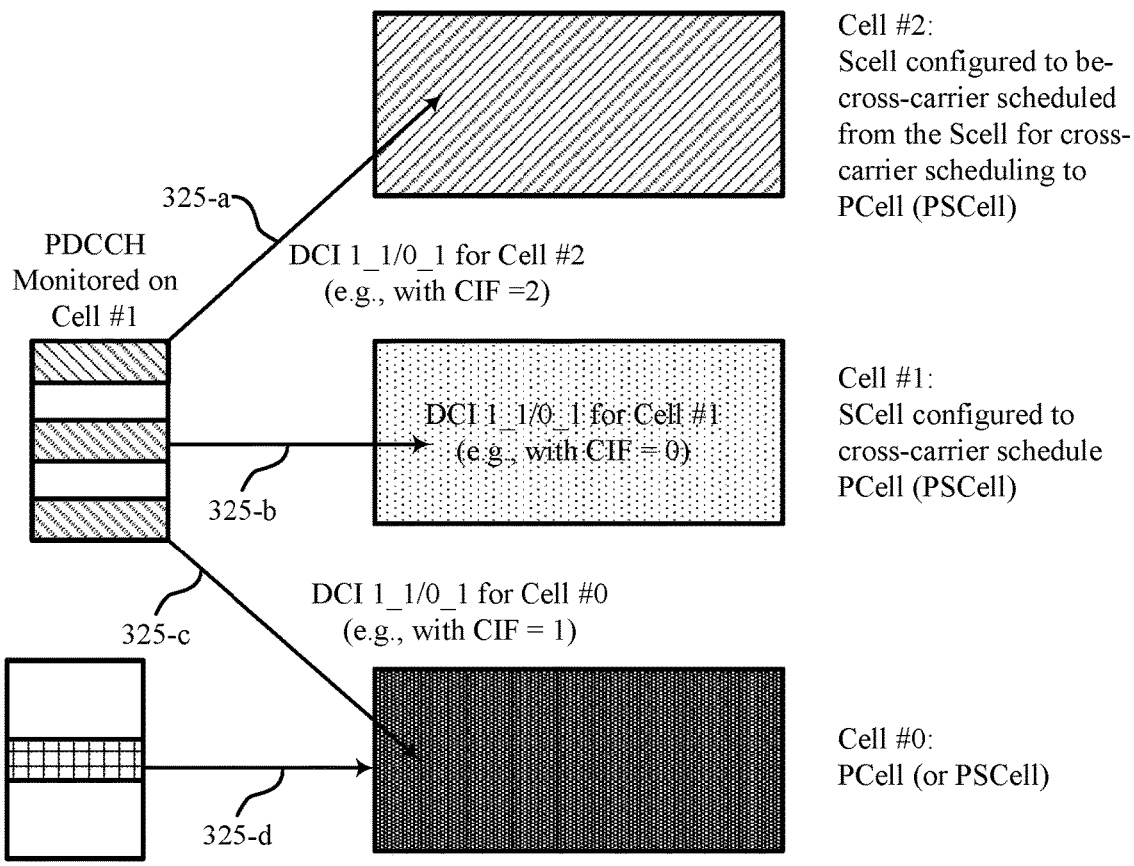
FIG. 3 illustrates an example of a resource diagram that supports secondary cell dormancy for cross-carrier scheduling from a secondary cell in accordance with aspects of the present disclosure.
Figure 3:
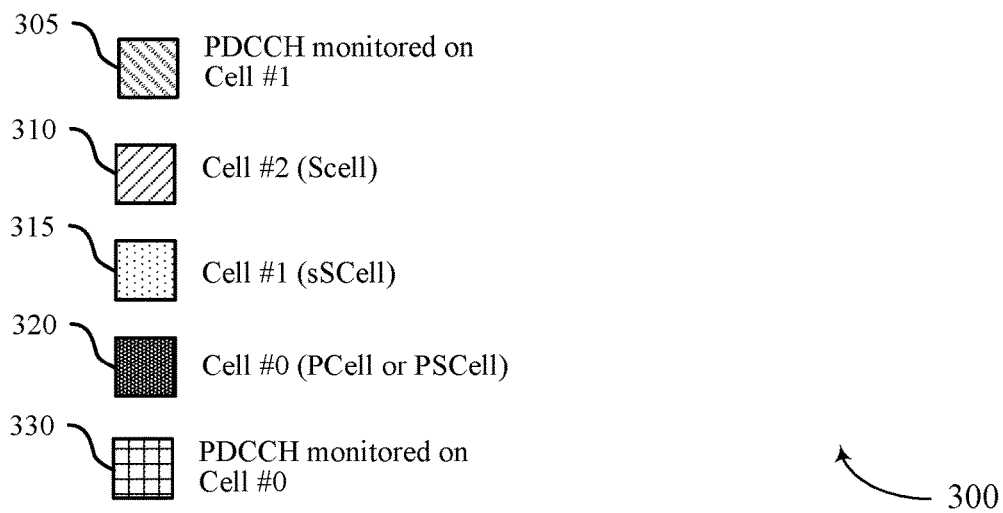

FIG. 3 illustrates an example of a resource diagram 300 that supports secondary cell dormancy for cross-carrier scheduling from a secondary cell in accordance with aspects of the present disclosure. The resource diagram 300 may be implemented by aspects of wireless communications system 100 and 200 as described with respect to FIGS. 1 and 2, such as a UE 115 or base station 105. The resource diagram includes one or more PDCCHs 305 that are monitored on resources of an SCell 315 (Cell #1). The resource diagram 300 also includes a PCell 320 (Cell #0) and another SCell 310 (Cell #2). Each of the cells may be configured at a UE 115. The SCell 315 may be an example of an sSCell that is configured for cross-carrier scheduling as described herein.

The cross carrier scheduling DCIs 1_1/0_1 that may be included in the PDCCH 305 may support SCell dormancy indications as described herein. Each of the arrows may represent a DCI 325 that is carried by the PDCCH 305 and includes a scheduling indication that schedules resources in the respective cell. As described herein, each DCI 325 that schedules communications in a cell may be configured to include the dormancy indication. The cell that a respective DCI corresponds to (e.g., schedules communications in) may be based on a CIF included in the DCI. For example, DCI 325-*a* may be a DCI that schedules communications in another SCell 310 (Cell #2) and includes a dormancy indication. DCI 325-*b* may be a DCI that schedules communications in the SCell 315 (Cell #1) and includes the dormancy indication. DCI 325-*c* may be a DCI that schedules communications in the PCell 320 (Cell #0). Each of the DCIs 325-*a*, 325-*b*, and 325-*c* may be carried by a PDCCH transmitted by the SCell 315 but may schedule communications in various cells. Further, each of the DCIs 325 may include a SCell dormancy indication.

Further, as described herein, PDCCH 330 that is monitored on the PCell 320 may carry a DCI 325-*d* with a dormancy indication field. As illustrated in FIG. 3, the DCI 325-*d* may schedule communications in the PCell 320 (e.g., PCell 320 to PCell 320 scheduling). In some cases, the DCI 325-*d* may not include a CIF. In other examples, the DCI 325-*d* may include a CIF=0 or a CIF value that is the same value as the DCI 325-*c* that also schedules communications in the PCell 320. This technique of including a CIF value in a DCI 325-*d* transmitted by the PCell 320 may support DCIs with the same length or size, which may reduce decoding complexities at the UE 115.

According to another technique, the DCIs 325 that schedule data for particular scheduled cells (e.g., for itself) or for particular CIF values (e.g., for CIF=0) may include the SCell dormancy cell. More particularly, whether the DCI 325 includes the dormancy field may depend on the CIF value in the DCI or the cell that is scheduled by the DCI. Thus, DCIs that schedule data in SCell 310, or include the CIF value corresponding to SCell 310, may not include the SCell dormancy indication field, while DCIs that schedule data in the SCell 315 may include the SCell dormancy indication field. Thus, the DCI 325-*b* may include the SCell dormancy indication field, while the DCI 325-*a* may not include the dormancy indication field. Similarly, the DCI 325-*d* may include the dormancy indication field. Whether the SCell dormancy indication field is included for a DCI dependent on the scheduled cell or CIF value may be configured at the UE 115 semi-statically.

Figure 4:
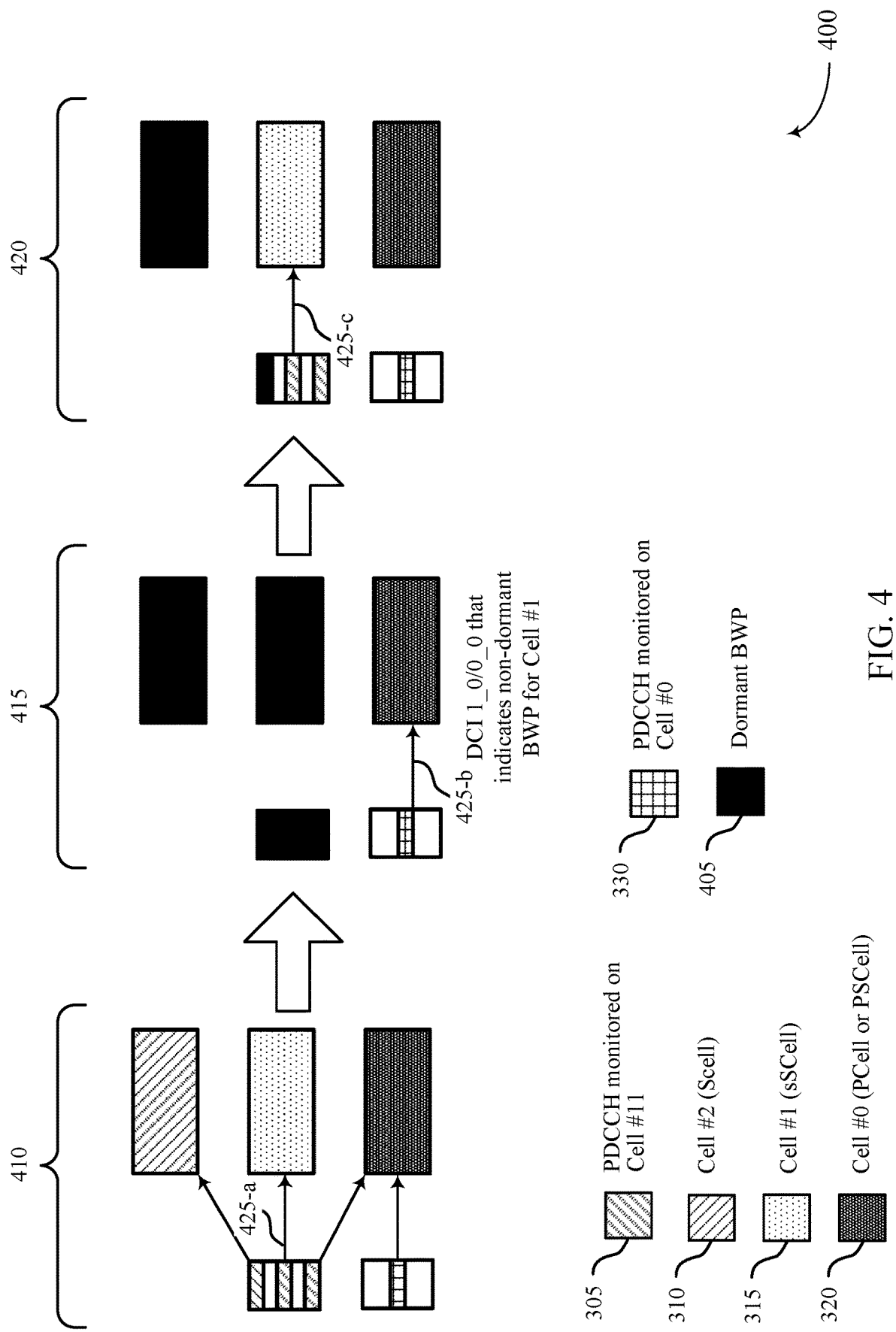
FIG. 4 illustrates an example of a resource diagram that supports secondary cell dormancy for cross-carrier scheduling from a secondary cell in accordance with aspects of the present disclosure.

FIG. 4 illustrates an example of a resource diagram 400 that supports secondary cell dormancy for cross-carrier scheduling from a secondary cell in accordance with aspects of the present disclosure. The resource diagram 400 may be implemented by aspects of wireless communications system 100 and 200 as described with respect to FIGS. 1 and 2, such as a UE 115 or base station 105. As described with respect to FIG. 3, the resource diagram includes one or more PDCCH 305 that are monitored on resources of an SCell 315 (Cell #1). The resource diagram 300 also includes a PCell 320 (Cell #0) and another SCell 310 (Cell #2). Each of the cells may be configured at a UE 115. The SCell 315 may be an example of an sSCell that is configured for cross-carrier scheduling as described herein.

At 410, the UE may monitor the PDCCH 350 on the SCell 315. The UE 115 may also monitor the PDCCH 330 on the PCell 320. A DCI, such as DCI 425-*a* may include a dormancy indication as described herein, and the dormancy indication may indicate that the SCell 315 is to switch to a dormant BWP 405 (e.g., a self-dormancy indication). In other cases, a DCI carried in the PDCCH 330 of the PCell may indicate that the SCell 315 is to switch to the dormant BWP 405. As illustrated at 415, the SCell 310 and the SCell 315 are both associated with a dormant BWP 405. Thus, the UE 115 is not monitoring for PDCCH in the SCell 315 (or SCell 310). In such cases, if the UE 115 is not configured to monitor a USS on the PCell 320, then there may not be a DCI format available for activating the SCells 310 and 315.

According to techniques described herein, the UE 115 may be configured to monitor for the fallback DCI formats (1_0 or 0_0) on the PDCCH 330 of the PCell 320. As illustrated at 415, a DCI 425-b is decoded by the UE, and the DCI 425-b (fallback DCI) may trigger activation of the scheduling SCell (e.g., SCell 315). In some cases, the DCI 425-b implicitly signals that the UE 115 is to switch to a non-dormant BWP for the SCell 315. In other cases, the DCI may include a field that signals that the UE 115 is to switch to the non-dormant BWP for the SCell 315. Thus, the fallback DCI may be used for reactivating SCells in order to support improved communication reliability and efficiency. Thereafter, the UE 115 may continue monitoring the PDCCH 305 in the SCell 315 at 420 for a DCI 425-c. This activation technique may be used in conjunction with SCells carrying dormancy indications or separate from such techniques.

Figure 5:
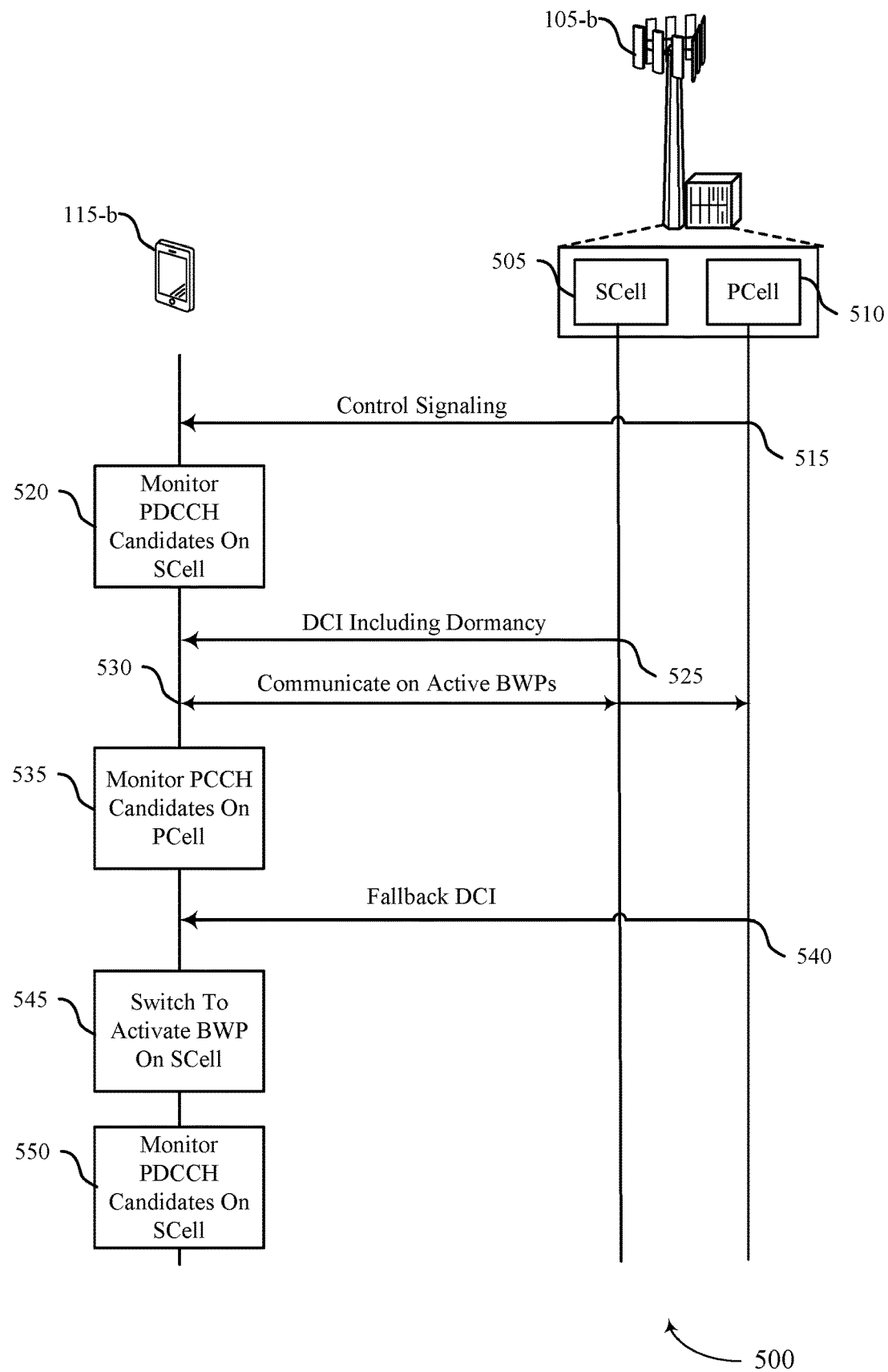
FIG. 5 illustrates an example of a process flow that supports secondary cell dormancy for cross-carrier scheduling from a secondary cell in accordance with aspects of the present disclosure.

FIG. 5 illustrates an example of a process flow 500 that supports secondary cell dormancy for cross-carrier scheduling from a secondary cell in accordance with aspects of the present disclosure. The process flow 500 may implement or be implemented by aspects of the wireless communications systems 100 or 200. For example, process flow 500 may be implemented by UEs 115-b and base station 105-b, which may each represent an example of the devices described with reference to FIGS. 1 through 4. Process flow 500 may be implemented by UEs 115-b and base station 105-b, for example, to support SCell dormancy indications in an SCell cross-carrier scheduling configuration, as described with reference to FIGS. 1 through 4.

In the following description of the process flow 500, the operations may be performed in a different order than the order shown, or the operations performed by UE 115-b and base station 105-b may be performed in different orders or at different times. For example, specific operations may also be left out of the process flow 500, or other operations may be added to the process flow 500. Although UE 115-b and base station 105-b are shown performing the operations of the process flow 500, some aspects of some operations may also be performed by one or more other devices.

At 515, the UE 115-b may receive, from the base station 105-b control signaling identifying a configuration for bandwidth parts of a plurality of cells that include at least a primary cell 510 and a secondary cell 505, where the secondary cell 505 supports cross carrier scheduling to at least the primary cell 510 in accordance with the configuration. The control signaling may be RRC, MAC-CE, DCI, or any combination thereof.

At 520, the UE 115-b may monitor a first set of downlink control channel candidates on the secondary cell 505 for a downlink control information message for at least one cell of the plurality of cells. The downlink control channel candidates may be monitored in one or more USS. The UE 115 may also monitor a second set of downlink control channel candidates on the primary cell 510.

At 525, the UE 115-b may receive on the secondary cell 505 based at least in part on monitoring the first set of downlink control channel candidates, the downlink control information message that includes a dormancy state indication for the at least one cell of the plurality of cells. The downlink control information message may be a DCI format 1_1, 0_1, 1_2, 0_2, or 2_6. In some cases, the DCI (e.g., 1_1 or 0_1) may schedule communications on the primary cell 510, the secondary cell 505, or another secondary cell. In some cases, the dormancy indication may indicate that one or more secondary cells are to switch to a dormant bandwidth part or switch from a dormant bandwidth part to an active bandwidth part. In some cases, the DCI may include the dormancy indication without scheduling communications on a cell.

At 530, the UE 115-b may communicate on active bandwidth parts of the plurality of cells based at least in part on the dormancy state indication for the at least one cell. The communications may include transmitting uplink transmissions (e.g., PUSCH transmissions) and/or receiving downlink transmissions (e.g., PDSCH transmissions) on the active bandwidth parts.

At 535, the UE may monitor a second set of downlink control channel candidates on the primary cell for a fallback downlink control information message based at least in part on the secondary cell 505 being associated with the dormant bandwidth part. That is, the DCI received at 515 (or another DCI) may indicate that the secondary cell 505 is to switch to a dormant bandwidth part. In such cases, the DCIs that include dormancy indications may not be available via the secondary cell 505 or the primary cell 510. As such, the UE 115-a may monitor for the fallback DCIs (e.g., DCI formats 1_0 or 0_0) in the PDCCH candidates of the primary cell 510 for triggering a switch to a non-dormant bandwidth part on the secondary cell 505 (e.g., the sSCell).

At 540, the UE 115 115-b may receive, on the primary cell 510, the fallback downlink control information message based at least in part on monitoring the second set of downlink control candidates.

At 545, the UE 115-b may switch to the bandwidth part on the secondary cell 505 to an active state based at least in part on receiving the fallback downlink control information message. In some cases, the UE 115-b may switch to the active bandwidth part on the secondary cell 505 based on the DCI being an implicit indication to switch. In another case, the DCI includes a field with an explicit indication that the secondary cell configured for cross-carrier scheduling is to switch to the active bandwidth part.

At 550, the UE 115-b may resume monitoring the PDCCH candidates on the secondary cell 505. As described herein, the UE 115 may monitor for the PDCCH candidates for DCI that includes the dormancy indication.

Figure 6:
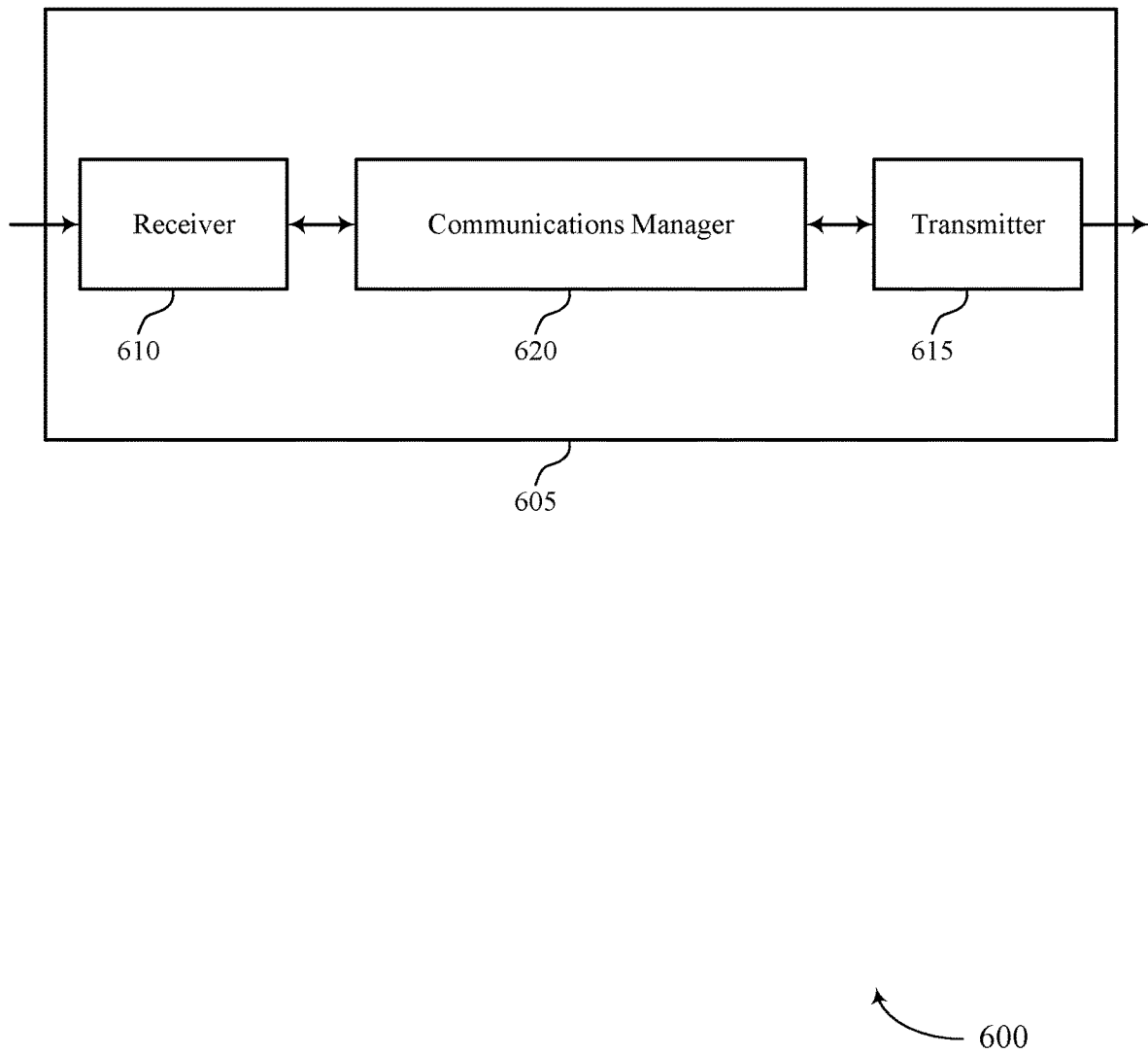
FIGS. 6 and 7 show block diagrams of devices that support secondary cell dormancy for cross-carrier scheduling from a secondary cell in accordance with aspects of the present disclosure.

FIG. 6 shows a block diagram 600 of a device 605 that supports secondary cell dormancy for cross-carrier scheduling from a secondary cell in accordance with aspects of the present disclosure. The device 605 may be an example of aspects of a UE 115 as described herein. The device 605 may include a receiver 610, a transmitter 615, and a communications manager 620. The device 605 may also include one or more processors, memory coupled with the one or more processors, and instructions stored in the memory that are executable by the one or more processors to enable the one or more processors to perform the dormancy indication features discussed herein. Each of these components may be in communication with one another (e.g., via one or more buses).

The receiver 610 may provide a means for receiving information such as packets, user data, control information, or any combination thereof associated with various information channels (e.g., control channels, data channels, information channels related to secondary cell dormancy for cross-carrier scheduling from a secondary cell). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to secondary cell dormancy for cross-carrier scheduling from a secondary cell). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of secondary cell dormancy for cross-carrier scheduling from a secondary cell as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a user equipment (UE) in accordance with examples as disclosed herein. For example, the communications manager 620 may be configured as or otherwise support a means for receiving, at the UE, control signaling identifying a configuration for bandwidth parts of a set of multiple cells that include at least a primary cell and a secondary cell, where the secondary cell supports cross carrier scheduling to at least the primary cell in accordance with the configuration. The communications manager 620 may be configured as or otherwise support a means for monitoring a first set of downlink control channel candidates on the secondary cell for a downlink control information message for at least one cell of the set of multiple cells. The communications manager 620 may be configured as or otherwise support a means for receiving, on the secondary cell based on monitoring the first set of downlink control channel candidates, the downlink control information message that includes a dormancy state indication for the at least one cell of the set of multiple cells. The communications manager 620 may be configured as or otherwise support a means for communicating on active bandwidth parts of the set of multiple cells based on the dormancy state indication for the at least one cell.

Additionally, or alternatively, the communications manager 620 may support wireless communications at a UE in accordance with examples as disclosed herein. For example, the communications manager 620 may be configured as or otherwise support a means for receiving, at the UE, control signaling identifying a configuration for bandwidth parts of a set of multiple cells that include at least a primary cell and a secondary cell, where the secondary cell supports cross carrier scheduling to at least the primary cell in accordance with the configuration. The communications manager 620 may be configured as or otherwise support a means for monitoring a set of downlink control channel candidates on the primary cell for a fallback downlink control information message based on the secondary cell being associated with a dormant bandwidth part. The communications manager 620 may be configured as or otherwise support a means for receiving, on the primary cell, the fallback downlink control information message based on monitoring the set of downlink control candidates. The communications manager 620 may be configured as or otherwise support a means for switching to an active bandwidth part on the secondary cell based on receiving the fallback downlink control information message.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced power consumption and more efficient utilization of communication resources by supporting secondary cell dormancy indications from a secondary cell.

Figure 7:
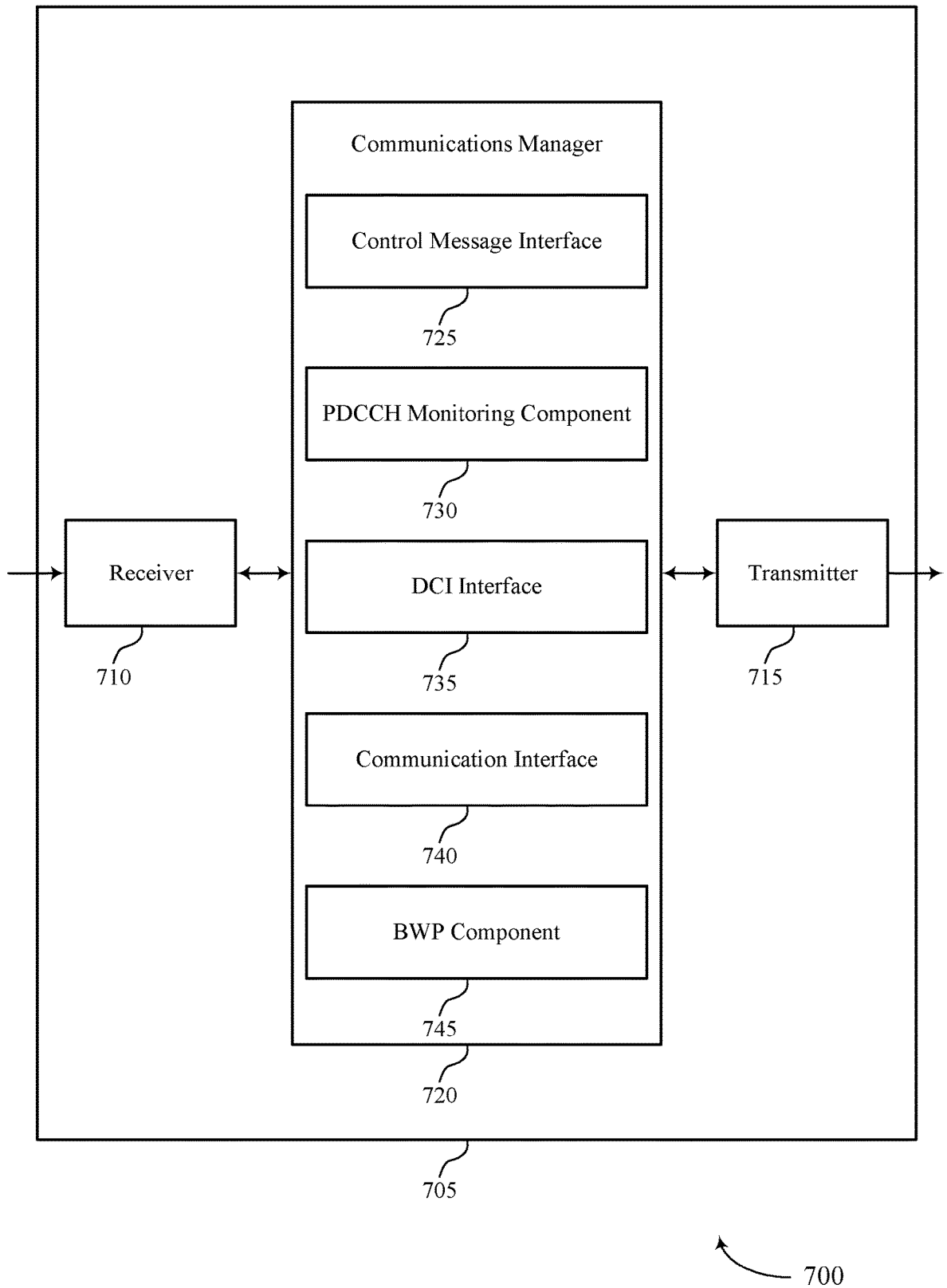

FIG. 7 shows a block diagram 700 of a device 705 that supports secondary cell dormancy for cross-carrier scheduling from a secondary cell in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to secondary cell dormancy for cross-carrier scheduling from a secondary cell). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to secondary cell dormancy for cross-carrier scheduling from a secondary cell). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of secondary cell dormancy for cross-carrier scheduling from a secondary cell as described herein. For example, the communications manager 720 may include a control message interface 725, a PDCCH monitoring component 730, a DCI interface 735, a communication interface 740, a BWP component 745, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a user equipment (UE) in accordance with examples as disclosed herein. The control message interface 725 may be configured as or otherwise support a means for receiving, at the UE, control signaling identifying a configuration for bandwidth parts of a set of multiple cells that include at least a primary cell and a secondary cell, where the secondary cell supports cross carrier scheduling to at least the primary cell in accordance with the configuration. The PDCCH monitoring component 730 may be configured as or otherwise support a means for monitoring a first set of downlink control channel candidates on the secondary cell for a downlink control information message for at least one cell of the set of multiple cells. The DCI interface 735 may be configured as or otherwise support a means for receiving, on the secondary cell based on monitoring the first set of downlink control channel candidates, the downlink control information message that includes a dormancy state indication for the at least one cell of the set of multiple cells. The communication interface 740 may be configured as or otherwise support a means for communicating on active bandwidth parts of the set of multiple cells based on the dormancy state indication for the at least one cell.

Additionally, or alternatively, the communications manager 720 may support wireless communications at a UE in accordance with examples as disclosed herein. The control message interface 725 may be configured as or otherwise support a means for receiving, at the UE, control signaling identifying a configuration for bandwidth parts of a set of multiple cells that include at least a primary cell and a secondary cell, where the secondary cell supports cross carrier scheduling to at least the primary cell in accordance with the configuration. The PDCCH monitoring component 730 may be configured as or otherwise support a means for monitoring a set of downlink control channel candidates on the primary cell for a fallback downlink control information message based on the secondary cell being associated with a dormant bandwidth part. The DCI interface 735 may be configured as or otherwise support a means for receiving, on the primary cell, the fallback downlink control information message based on monitoring the set of downlink control candidates. The BWP component 745 may be configured as or otherwise support a means for switching to an active bandwidth part on the secondary cell based on receiving the fallback downlink control information message.

In some cases, the control message interface 725, the PDCCH monitoring component 730, the DCI interface 735, the communication interface 740, the BWP component 745 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control message interface 725, the PDCCH monitoring component 730, the DCI interface 735, the communication interface 740, the BWP component 745 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 8:
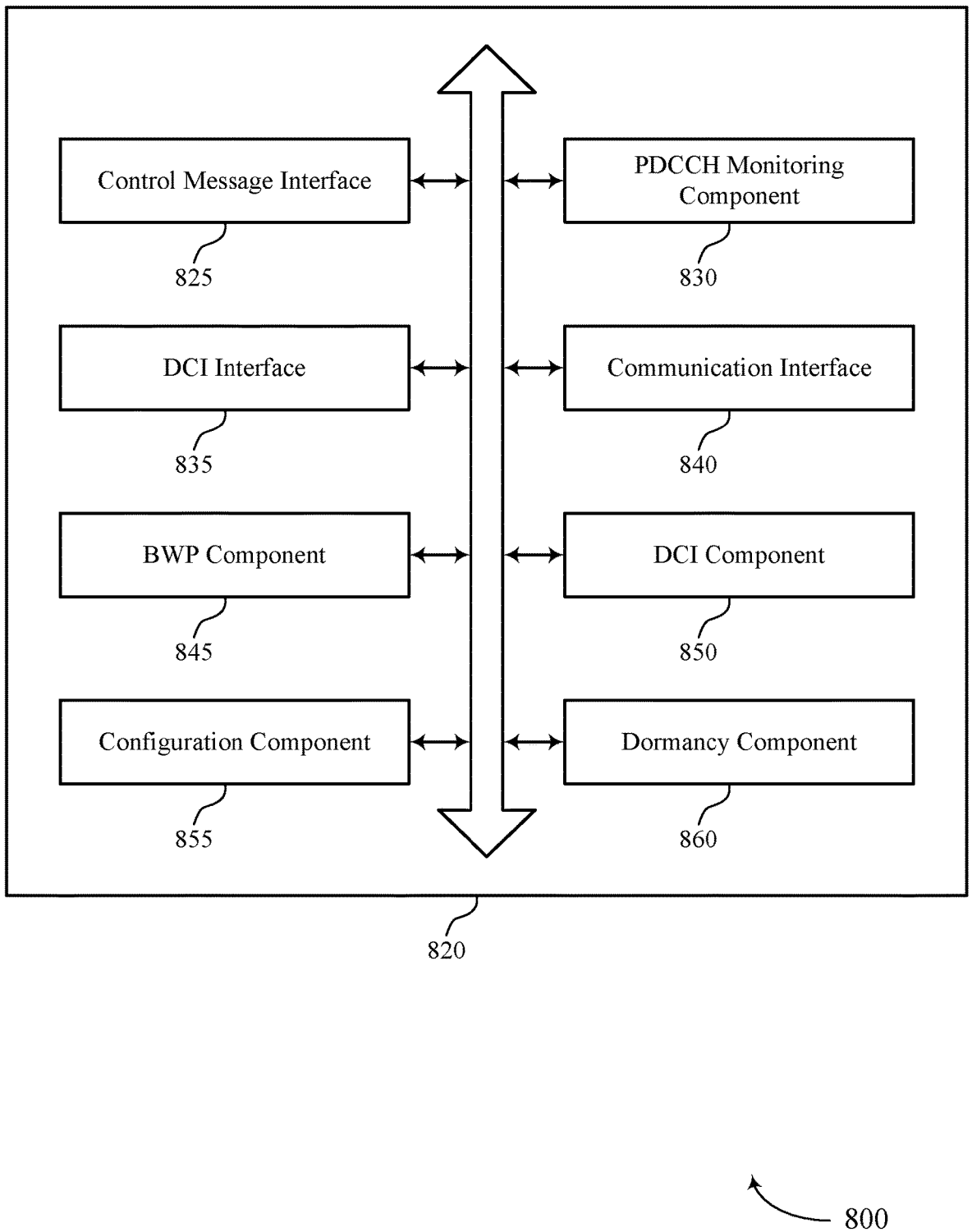
FIG. 8 shows a block diagram of a communications manager that supports secondary cell dormancy for cross-carrier scheduling from a secondary cell in accordance with aspects of the present disclosure.

FIG. 8 shows a block diagram 800 of a communications manager 820 that supports secondary cell dormancy for cross-carrier scheduling from a secondary cell in accordance with aspects of the present disclosure. The communications manager 820 may be an example of aspects of a communications manager 620, a communications manager 720, or both, as described herein. The communications manager 820, or various components thereof, may be an example of means for performing various aspects of secondary cell dormancy for cross-carrier scheduling from a secondary cell as described herein. For example, the communications manager 820 may include a control message interface 825, a PDCCH monitoring component 830, a DCI interface 835, a communication interface 840, a BWP component 845, a DCI component 850, a configuration component 855, a dormancy component 860, or any combination thereof. Each of these components may communicate, directly or indirectly, with one another (e.g., via one or more buses).

The communications manager 820 may support wireless communications at a user equipment (UE) in accordance with examples as disclosed herein. The control message interface 825 may be configured as or otherwise support a means for receiving, at the UE, control signaling identifying a configuration for bandwidth parts of a set of multiple cells that include at least a primary cell and a secondary cell, where the secondary cell supports cross carrier scheduling to at least the primary cell in accordance with the configuration. The PDCCH monitoring component 830 may be configured as or otherwise support a means for monitoring a first set of downlink control channel candidates on the secondary cell for a downlink control information message for at least one cell of the set of multiple cells. The DCI interface 835 may be configured as or otherwise support a means for receiving, on the secondary cell based on monitoring the first set of downlink control channel candidates, the downlink control information message that includes a dormancy state indication for the at least one cell of the set of multiple cells. The communication interface 840 may be configured as or otherwise support a means for communicating on active bandwidth parts of the set of multiple cells based on the dormancy state indication for the at least one cell.

In some examples, the DCI component 850 may be configured as or otherwise support a means for determining that the downlink control information message includes the dormancy state indication based on a value of a cell indicator field of the downlink control information message.

In some examples, the control message interface 825 may be configured as or otherwise support a means for receiving an indication of a downlink control configuration that specifies that the dormancy state indication is to be included in downlink control information messages that schedule a cell associated with the value of the cell indicator field, where the UE determines the downlink control information message includes the dormancy state indication based on the received downlink control configuration.

In some examples, the PDCCH monitoring component 830 may be configured as or otherwise support a means for monitoring a second set of downlink control channel candidates of a UE specific search space on the primary cell for a second downlink control information message. In some examples, the DCI interface 835 may be configured as or otherwise support a means for receiving, based on monitoring the second set of downlink control channel candidates, the second downlink control information message including the dormancy state indication for the at least one cell.

In some examples, the DCI component 850 may be configured as or otherwise support a means for determining that the second downlink control information message includes a value of a cell indicator field of zero, or a same value that is included in the cell indicator field of the first downlink control information message.

In some examples, the DCI component 850 may be configured as or otherwise support a means for determining that the second downlink control information message lacks a cell indicator field based on the second downlink control information message being received on the primary cell.

In some examples, the configuration component 855 may be configured as or otherwise support a means for receiving a semi-static configuration that specifies that the secondary cell is to transmit the downlink control information message that includes the dormancy state indication, where the first set of downlink control channel candidates are monitored for the downlink control information message including the dormancy state indication based on the semi-static configuration.

In some examples, the dormancy component 860 may be configured as or otherwise support a means for determining that the secondary cell is associated with a dormant bandwidth part based on the dormancy indication. In some examples, the PDCCH monitoring component 830 may be configured as or otherwise support a means for monitoring a second set of downlink control channel candidates on the primary cell for a fallback downlink control information message based on the secondary cell being associated with the dormant bandwidth part. In some examples, the DCI interface 835 may be configured as or otherwise support a means for receiving, on the primary cell, the fallback downlink control information message based on monitoring the second set of downlink control candidates. In some examples, the BWP component 845 may be configured as or otherwise support a means for switching to an active bandwidth part on the secondary cell based on receiving the fallback downlink control information message.

In some examples, to support receiving the fallback downlink control information message, the DCI interface 835 may be configured as or otherwise support a means for receiving the fallback downlink control information message that includes an indication to switch to the active bandwidth part on the secondary cell, where the UE switches to the active bandwidth part based on the indication.

In some examples, the non-fallback downlink control information message is a DCI format 1_1, or a DCI format 0_1, or a DCI format 1_2, or a DCI format 0_2 and the fallback downlink control information message is a DCI format 1_0 or a DCI format 0_0.

In some examples, to support receiving the downlink control information message, the DCI interface 835 may be configured as or otherwise support a means for receiving the downlink control information message that schedules a resource for communication in the primary cell, the secondary cell, or another secondary cell of the set of multiple cells.

In some examples, the DCI component 850 may be configured as or otherwise support a means for performing blind decoding on the first set of downlink control channel candidates of a UE specific search space set of the secondary cell, where the downlink control information message is received based on the blind decoding.

Additionally, or alternatively, the communications manager 820 may support wireless communications at a UE in accordance with examples as disclosed herein. In some examples, the control message interface 825 may be configured as or otherwise support a means for receiving, at the UE, control signaling identifying a configuration for bandwidth parts of a set of multiple cells that include at least a primary cell and a secondary cell, where the secondary cell supports cross carrier scheduling to at least the primary cell in accordance with the configuration. In some examples, the PDCCH monitoring component 830 may be configured as or otherwise support a means for monitoring a set of downlink control channel candidates on the primary cell for a fallback downlink control information message based on the secondary cell being associated with a dormant bandwidth part. In some examples, the DCI interface 835 may be configured as or otherwise support a means for receiving, on the primary cell, the fallback downlink control information message based on monitoring the set of downlink control candidates. The BWP component 845 may be configured as or otherwise support a means for switching to an active bandwidth part on the secondary cell based on receiving the fallback downlink control information message.

In some examples, the PDCCH monitoring component 830 may be configured as or otherwise support a means for monitoring a second set of downlink control channel candidates on the secondary cell for a downlink control information message for at least one cell of the set of multiple cells. In some examples, the DCI interface 835 may be configured as or otherwise support a means for receiving, on the secondary cell based on monitoring the second set of downlink control channel candidates, the downlink control information message that includes a dormancy state indication for the at least one cell of the set of multiple cells. In some examples, the communication interface 840 may be configured as or otherwise support a means for communicating on active bandwidth parts of the set of multiple cells based on the dormancy state indication for the at least one cell.

In some examples, the downlink control information message is a DCI format 1_1, or a DCI format 0_1, or a DCI format 1_2, or a DCI format 0_2 and the fallback downlink control information message is a DCI format 1_0 or a DCI format 0_0.

In some examples, to support receiving the fallback downlink control information message, the DCI interface 835 may be configured as or otherwise support a means for receiving the fallback downlink control information message that includes an indication to switch to the active bandwidth part on the secondary cell, where the UE switches to the active bandwidth part based on the indication.

In some cases, the control message interface 825, the PDCCH monitoring component 830, the DCI interface 835, the communication interface 840, the BWP component 845, the DCI component 850, the configuration component 855, the dormancy component 860 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of [the control message interface 825, the PDCCH monitoring component 830, the DCI interface 835, the communication interface 840, the BWP component 845, the DCI component 850, the configuration component 855, the dormancy component 860 discussed herein.

Figure 9:
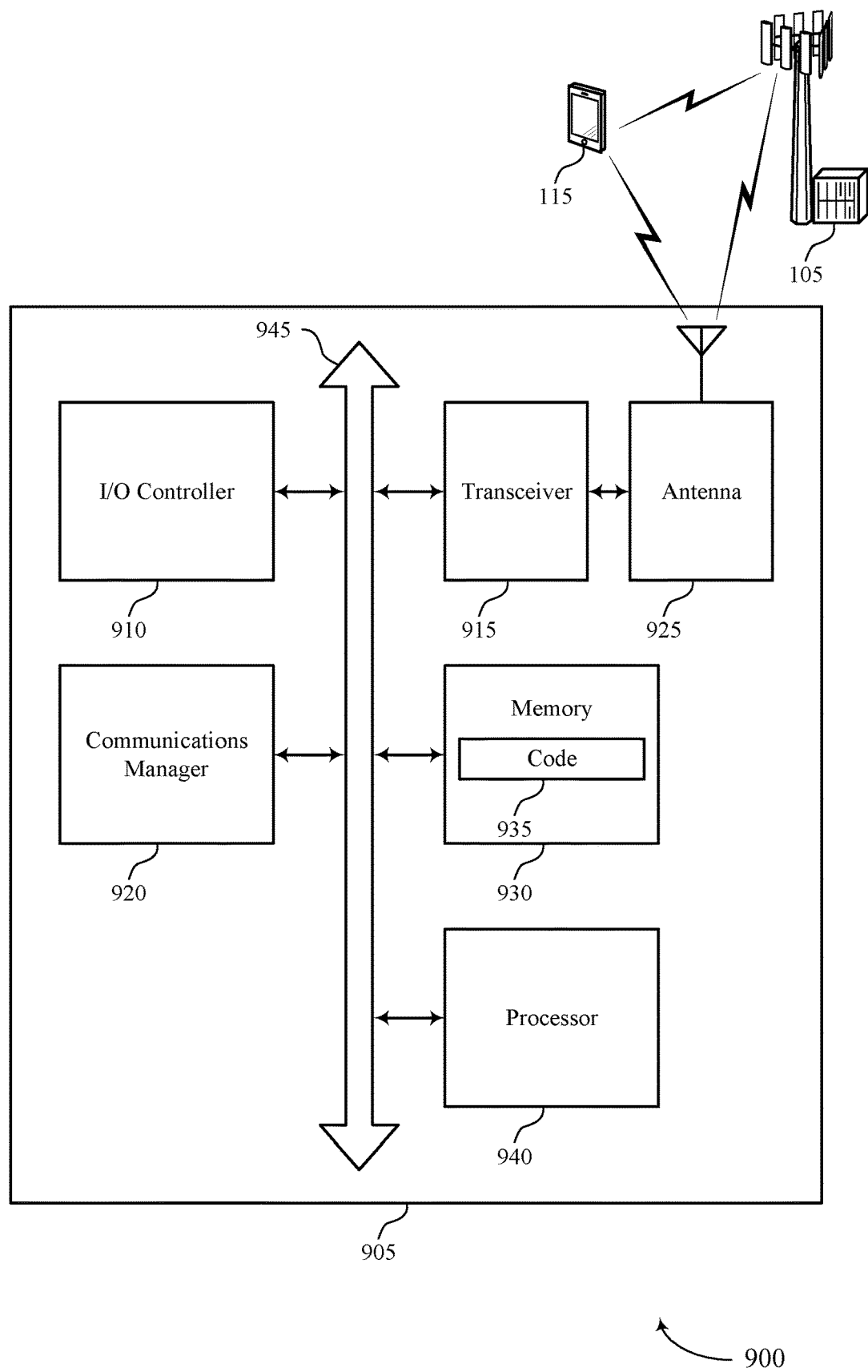
FIG. 9 shows a diagram of a system including a device that supports secondary cell dormancy for cross-carrier scheduling from a secondary cell in accordance with aspects of the present disclosure.

FIG. 9 shows a diagram of a system 900 including a device 905 that supports secondary cell dormancy for cross-carrier scheduling from a secondary cell in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting secondary cell dormancy for cross-carrier scheduling from a secondary cell). For example, the device 905 or a component of the device 905 may include a processor 940 and memory 930 coupled with the processor 940, the processor 940 and memory 930 configured to perform various functions described herein.

The communications manager 920 may support wireless communications at a user equipment (UE) in accordance with examples as disclosed herein. For example, the communications manager 920 may be configured as or otherwise support a means for receiving, at the UE, control signaling identifying a configuration for bandwidth parts of a set of multiple cells that include at least a primary cell and a secondary cell, where the secondary cell supports cross carrier scheduling to at least the primary cell in accordance with the configuration. The communications manager 920 may be configured as or otherwise support a means for monitoring a first set of downlink control channel candidates on the secondary cell for a downlink control information message for at least one cell of the set of multiple cells. The communications manager 920 may be configured as or otherwise support a means for receiving, on the secondary cell based on monitoring the first set of downlink control channel candidates, the downlink control information message that includes a dormancy state indication for the at least one cell of the set of multiple cells. The communications manager 920 may be configured as or otherwise support a means for communicating on active bandwidth parts of the set of multiple cells based on the dormancy state indication for the at least one cell.

Additionally, or alternatively, the communications manager 920 may support wireless communications at a UE in accordance with examples as disclosed herein. For example, the communications manager 920 may be configured as or otherwise support a means for receiving, at the UE, control signaling identifying a configuration for bandwidth parts of a set of multiple cells that include at least a primary cell and a secondary cell, where the secondary cell supports cross carrier scheduling to at least the primary cell in accordance with the configuration. The communications manager 920 may be configured as or otherwise support a means for monitoring a set of downlink control channel candidates on the primary cell for a fallback downlink control information message based on the secondary cell being associated with a dormant bandwidth part. The communications manager 920 may be configured as or otherwise support a means for receiving, on the primary cell, the fallback downlink control information message based on monitoring the set of downlink control candidates. The communications manager 920 may be configured as or otherwise support a means for switching to an active bandwidth part on the secondary cell based on receiving the fallback downlink control information message.

By including or configuring the communications manager 920 in accordance with examples as described herein, the device 905 may support techniques for reduced power consumption and more efficient utilization of communication resources by supporting secondary cell dormancy indications by a secondary cell that is configured for cross-carrier scheduling. These techniques may reduce latency and improve user experience based on the efficient resource utilization and power saving techniques via cell dormancy.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of secondary cell dormancy for cross-carrier scheduling from a secondary cell as described herein, or the processor 940 and the memory 930 may be otherwise configured to perform or support such operations.

Figure 10:
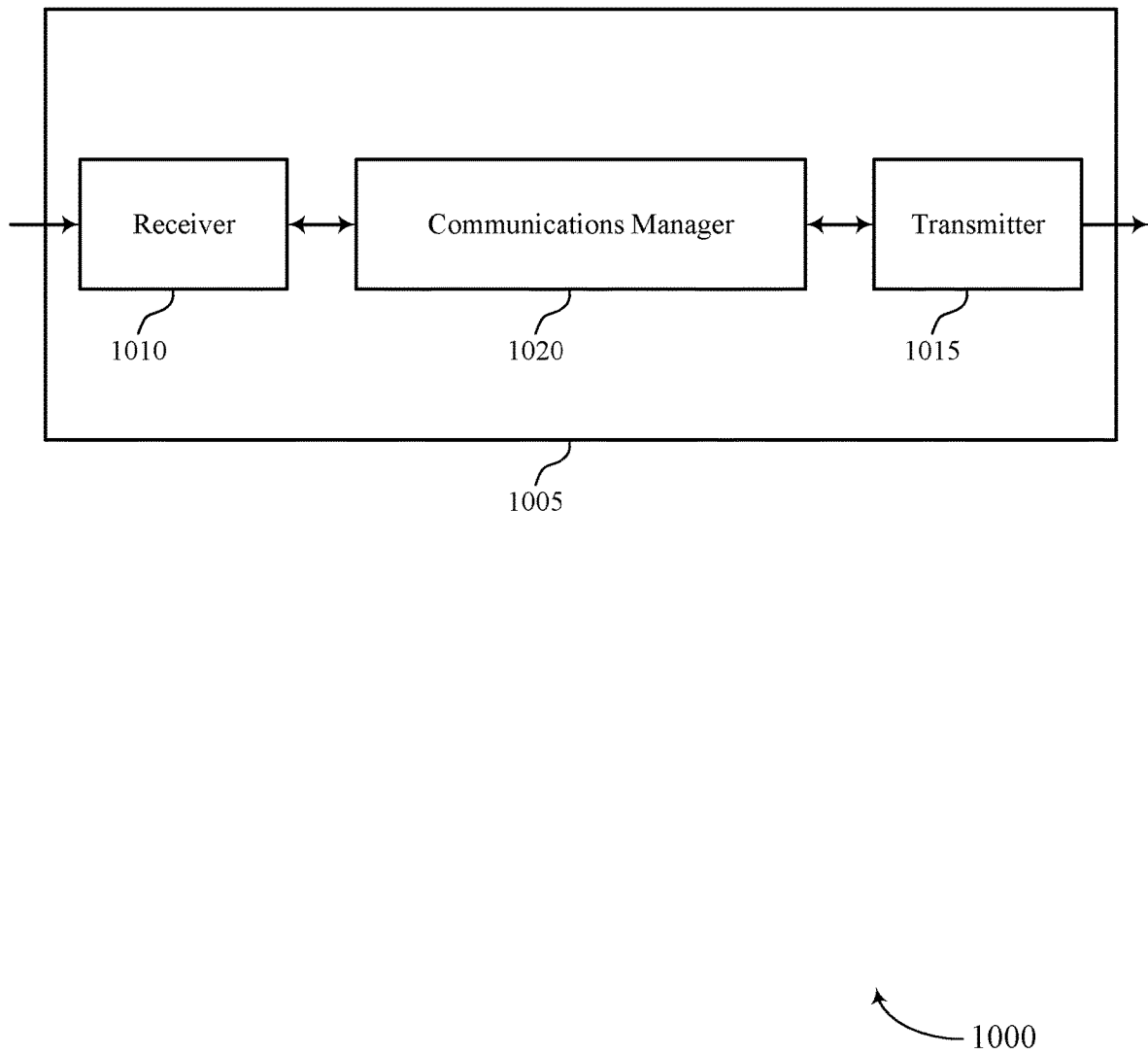
FIGS. 10 and 11 show block diagrams of devices that support secondary cell dormancy for cross-carrier scheduling from a secondary cell in accordance with aspects of the present disclosure.

FIG. 10 shows a block diagram 1000 of a device 1005 that supports secondary cell dormancy for cross-carrier scheduling from a secondary cell in accordance with aspects of the present disclosure. The device 1005 may be an example of aspects of a base station 105 as described herein. The device 1005 may include a receiver 1010, a transmitter 1015, and a communications manager 1020. The device 1005 may also include one or more processors, memory coupled with the one or more processors, and instructions stored in the memory that are executable by the one or more processors to enable the one or more processors to perform the dormancy indication features discussed herein. Each of these components may be in communication with one another (e.g., via one or more buses).

The receiver 1010 may provide a means for receiving information such as packets, user data, control information, or any combination thereof associated with various information channels (e.g., control channels, data channels, information channels related to secondary cell dormancy for cross-carrier scheduling from a secondary cell). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to secondary cell dormancy for cross-carrier scheduling from a secondary cell). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of secondary cell dormancy for cross-carrier scheduling from a secondary cell as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured as or otherwise support a means for transmitting, to a UE, control signaling identifying a configuration for bandwidth parts of a set of multiple cells that includes at least a primary cell and a secondary cell, where the secondary cell supports cross carrier scheduling of at least the primary cell in accordance with the configuration. The communications manager 1020 may be configured as or otherwise support a means for transmitting, to the UE on the secondary cell, a downlink control information message that includes a dormancy state indication for at least one cell of the set of multiple cells. The communications manager 1020 may be configured as or otherwise support a means for communicating, with the UE, on active bandwidth parts of the set of multiple cells based at least in part on the dormancy state indication for the at least one cell.

Additionally, or alternatively, the communications manager 1020 may support wireless communications at a base station in accordance with examples as disclosed herein. For example, the communications manager 1020 may be configured as or otherwise support a means for transmitting, to a UE, control signaling identifying a configuration for bandwidth parts of a set of multiple cells that include at least a primary cell and a secondary cell, where the secondary cell supports cross carrier scheduling of at least the primary cell in accordance with the configuration. The communications manager 1020 may be configured as or otherwise support a means for determining that the secondary cell is associated with a dormant bandwidth part. The communications manager 1020 may be configured as or otherwise support a means for transmitting, on the primary cell, a fallback downlink control information message based on the secondary cell being associated with the dormant bandwidth part. The communications manager 1020 may be configured as or otherwise support a means for switching to an active bandwidth part on the secondary cell based on transmitting the fallback downlink control information message.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced power consumption and more efficient utilization of communication resources by supporting secondary cell dormancy indications from a secondary cell.

Figure 11:
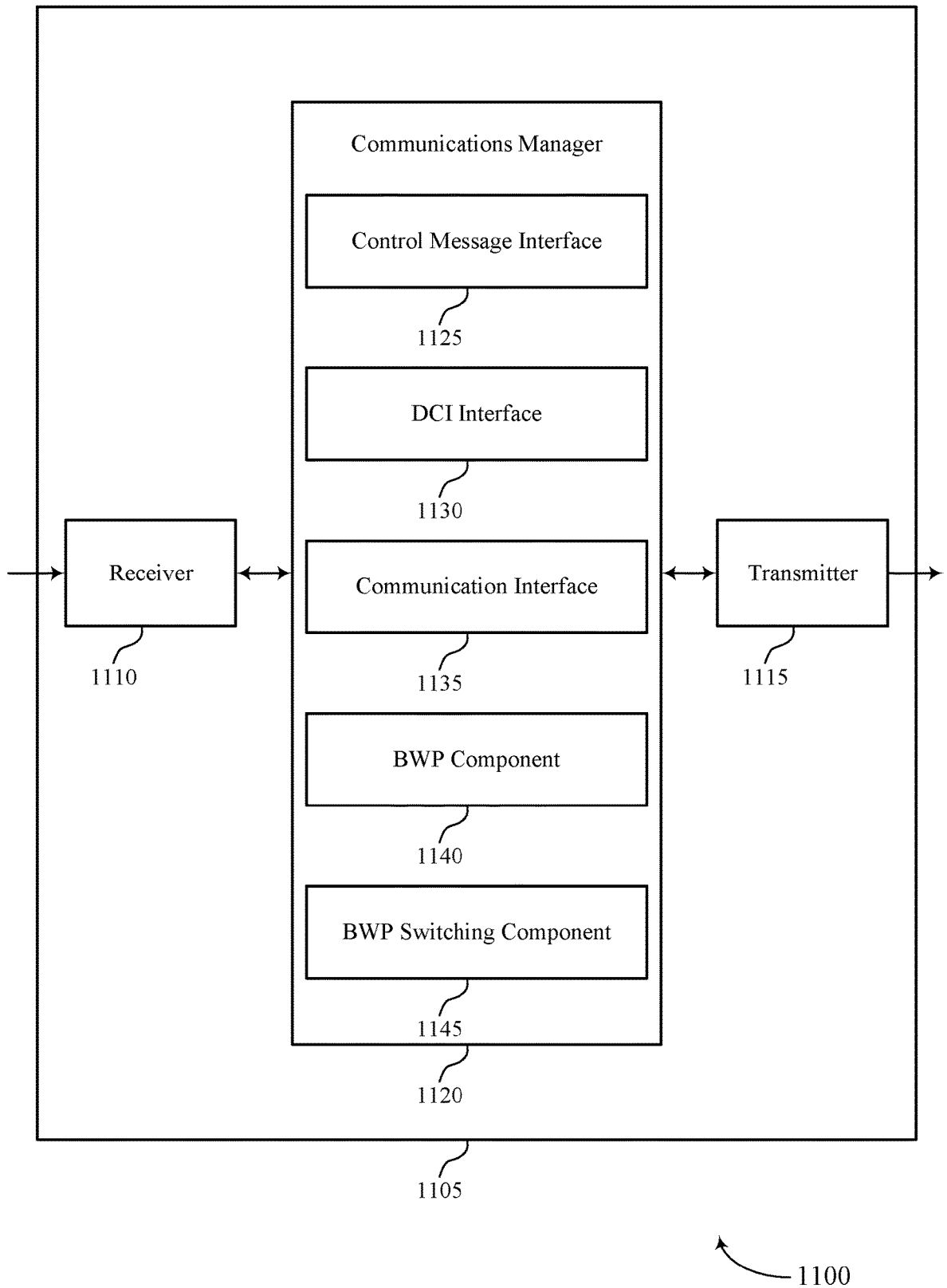

FIG. 11 shows a block diagram 1100 of a device 1105 that supports secondary cell dormancy for cross-carrier scheduling from a secondary cell in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to secondary cell dormancy for cross-carrier scheduling from a secondary cell). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to secondary cell dormancy for cross-carrier scheduling from a secondary cell). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of secondary cell dormancy for cross-carrier scheduling from a secondary cell as described herein. For example, the communications manager 1120 may include a control message interface 1125, a DCI interface 1130, a communication interface 1135, a BWP component 1140, a BWP switching component 1145, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The control message interface 1125 may be configured as or otherwise support a means for transmitting, to a UE, control signaling identifying a configuration for bandwidth parts of a set of multiple cells that includes at least a primary cell and a secondary cell, where the secondary cell supports cross carrier scheduling of at least the primary cell in accordance with the configuration. The DCI interface 1130 may be configured as or otherwise support a means for transmitting, to the UE on the secondary cell, a downlink control information message that includes a dormancy state indication for at least one cell of the set of multiple cells. The communication interface 1135 may be configured as or otherwise support a means for communicating, with the UE, on active bandwidth parts of the set of multiple cells based on the dormancy state indication for the at least one cell.

Additionally, or alternatively, the communications manager 1120 may support wireless communications at a base station in accordance with examples as disclosed herein. The control message interface 1125 may be configured as or otherwise support a means for transmitting, to a UE, control signaling identifying a configuration for bandwidth parts of a set of multiple cells that include at least a primary cell and a secondary cell, where the secondary cell supports cross carrier scheduling of at least the primary cell in accordance with the configuration. The BWP component 1140 may be configured as or otherwise support a means for determining that the secondary cell is associated with a dormant bandwidth part. The DCI interface 1130 may be configured as or otherwise support a means for transmitting, on the primary cell, a fallback downlink control information message based on the secondary cell being associated with the dormant bandwidth part. The BWP switching component 1145 may be configured as or otherwise support a means for switching to an active bandwidth part on the secondary cell based on transmitting the fallback downlink control information message.

In some cases, the control message interface 1125, the DCI interface 1130, the communication interface 1135, the BWP component 1140, and the BWP switching component 1145 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control message interface 1125, the DCI interface 1130, the communication interface 1135, the BWP component 1140, and the BWP switching component 1145 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 12:
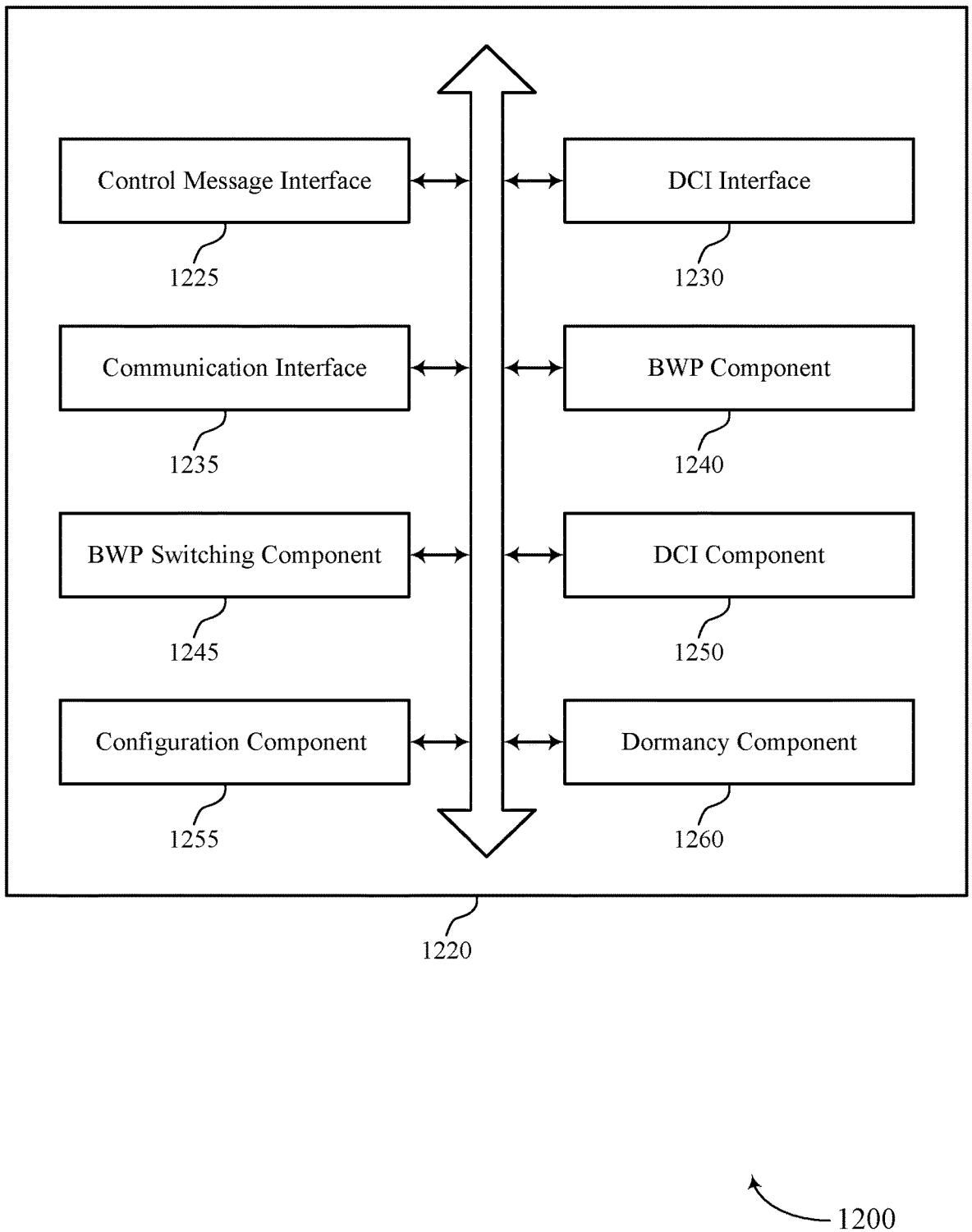
FIG. 12 shows a block diagram of a communications manager that supports secondary cell dormancy for cross-carrier scheduling from a secondary cell in accordance with aspects of the present disclosure.

FIG. 12 shows a block diagram 1200 of a communications manager 1220 that supports secondary cell dormancy for cross-carrier scheduling from a secondary cell in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of secondary cell dormancy for cross-carrier scheduling from a secondary cell as described herein. For example, the communications manager 1220 may include a control message interface 1225, a DCI interface 1230, a communication interface 1235, a BWP component 1240, a BWP switching component 1245, a DCI component 1250, a configuration component 1255, a dormancy component 1260, or any combination thereof. Each of these components may communicate, directly or indirectly, with one another (e.g., via one or more buses).

The communications manager 1220 may support wireless communications at a base station in accordance with examples as disclosed herein. The control message interface 1225 may be configured as or otherwise support a means for transmitting, to a UE, control signaling identifying a configuration for bandwidth parts of a set of multiple cells that includes at least a primary cell and a secondary cell, where the secondary cell supports cross carrier scheduling of at least the primary cell in accordance with the configuration. The DCI interface 1230 may be configured as or otherwise support a means for transmitting, to the UE on the secondary cell, a downlink control information message that includes a dormancy state indication for at least one cell of the set of multiple cells. The communication interface 1235 may be configured as or otherwise support a means for communicating, with the UE, on active bandwidth parts of the set of multiple cells based on the dormancy state indication for the at least one cell.

In some examples, the DCI component 1250 may be configured as or otherwise support a means for including the dormancy state indication in the downlink control information message based on a value of a cell indicator field of the downlink control information message.

In some examples, the DCI interface 1230 may be configured as or otherwise support a means for transmitting an indication of a downlink control configuration that specifies that the dormancy state indication is to be included in downlink control information messages that schedule a cell associated with the value of the cell indicator field, where the dormancy state indication is included in the downlink control information message based on the downlink control configuration.

In some examples, the DCI interface 1230 may be configured as or otherwise support a means for transmitting, on the primary cell, a second downlink control information message including the dormancy state indication for the at least one cell.

In some examples, the DCI component 1250 may be configured as or otherwise support a means for including, in the second downlink control information message, a value of a cell indicator field of zero, or a same value that is included in the cell indicator field of the first downlink control information message based on the second downlink control information message including the dormancy state indication and being transmitted on the primary cell.

In some examples, to support transmitting the second downlink control information message, the DCI interface 1230 may be configured as or otherwise support a means for transmitting the second downlink control information message without a cell indicator field based on the second downlink control information message including the dormancy state indication and being transmitted on the primary cell.

In some examples, the configuration component 1255 may be configured as or otherwise support a means for transmitting, to the UE, a semi-static configuration that specifies that the secondary cell is to transmit the downlink control information message that includes the dormancy state indication, where the downlink control information message including the dormancy state indication is transmitted on the secondary cell based on the semi-static configuration.

In some examples, the dormancy component 1260 may be configured as or otherwise support a means for determining that the secondary cell is associated with a dormant bandwidth part based on the dormancy indication. In some examples, the DCI interface 1230 may be configured as or otherwise support a means for transmitting, on the primary cell, a fallback downlink control information message based on the secondary cell being associated with the dormant bandwidth part. In some examples, the BWP component 1240 may be configured as or otherwise support a means for determining that the secondary cell is switched to an active bandwidth part based on transmitting the fallback downlink control information message.

In some examples, to support transmitting the fallback downlink control information message, the DCI interface 1230 may be configured as or otherwise support a means for transmitting the fallback downlink control information message that includes an indication to switch to the active bandwidth part on the secondary cell.

In some examples, the non-fallback downlink control information message is a DCI format 1_1 or a DCI format 0_1 and the fallback downlink control information message is a DCI format 1_0 or a DCI format 0_0.

In some examples, to support transmitting the downlink control information message, the DCI interface 1230 may be configured as or otherwise support a means for transmitting the downlink control information message that schedules a resource for communication in the primary cell, the secondary cell, or another secondary cell of the set of multiple cells.

In some examples, to support transmitting the downlink control information message, the DCI interface 1230 may be configured as or otherwise support a means for transmitting the downlink control information message in a UE specific search space set of the secondary cell.

Additionally, or alternatively, the communications manager 1220 may support wireless communications at a base station in accordance with examples as disclosed herein. In some examples, the control message interface 1225 may be configured as or otherwise support a means for transmitting, to a UE, control signaling identifying a configuration for bandwidth parts of a set of multiple cells that include at least a primary cell and a secondary cell, where the secondary cell supports cross carrier scheduling of at least the primary cell in accordance with the configuration. The BWP component 1240 may be configured as or otherwise support a means for determining that the secondary cell is associated with a dormant bandwidth part. In some examples, the DCI interface 1230 may be configured as or otherwise support a means for transmitting, on the primary cell, a fallback downlink control information message based on the secondary cell being associated with the dormant bandwidth part. The BWP switching component 1245 may be configured as or otherwise support a means for switching to an active bandwidth part on the secondary cell based on transmitting the fallback downlink control information message.

In some examples, the DCI interface 1230 may be configured as or otherwise support a means for transmitting, on the secondary cell, a downlink control information message that includes a dormancy state indication for the at least one cell of the set of multiple cells. In some examples, the DCI interface 1230 may be configured as or otherwise support a means for communicating on active bandwidth parts of the set of multiple cells based on the dormancy state indication for the at least one cell.

In some examples, the downlink control information message is a DCI format 1_1 or a DCI format 0_1 and the fallback downlink control information message is a DCI format 1_0 or a DCI format 0_0.

In some examples, to support transmitting the fallback downlink control information message, the DCI interface 1230 may be configured as or otherwise support a means for transmitting the fallback downlink control information message that includes an indication to switch to the active bandwidth part on the secondary cell.

In some cases, the control message interface 1225, the DCI interface 1230, the communication interface 1235, the BWP component 1240, the BWP switching component 1245, the DCI component 1250, the configuration component 1255, the dormancy component 1260 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control message interface 1225, the DCI interface 1230, the communication interface 1235, the BWP component 1240, the BWP switching component 1245, the DCI component 1250, the configuration component 1255, the dormancy component 1260 discussed herein.

Figure 13:
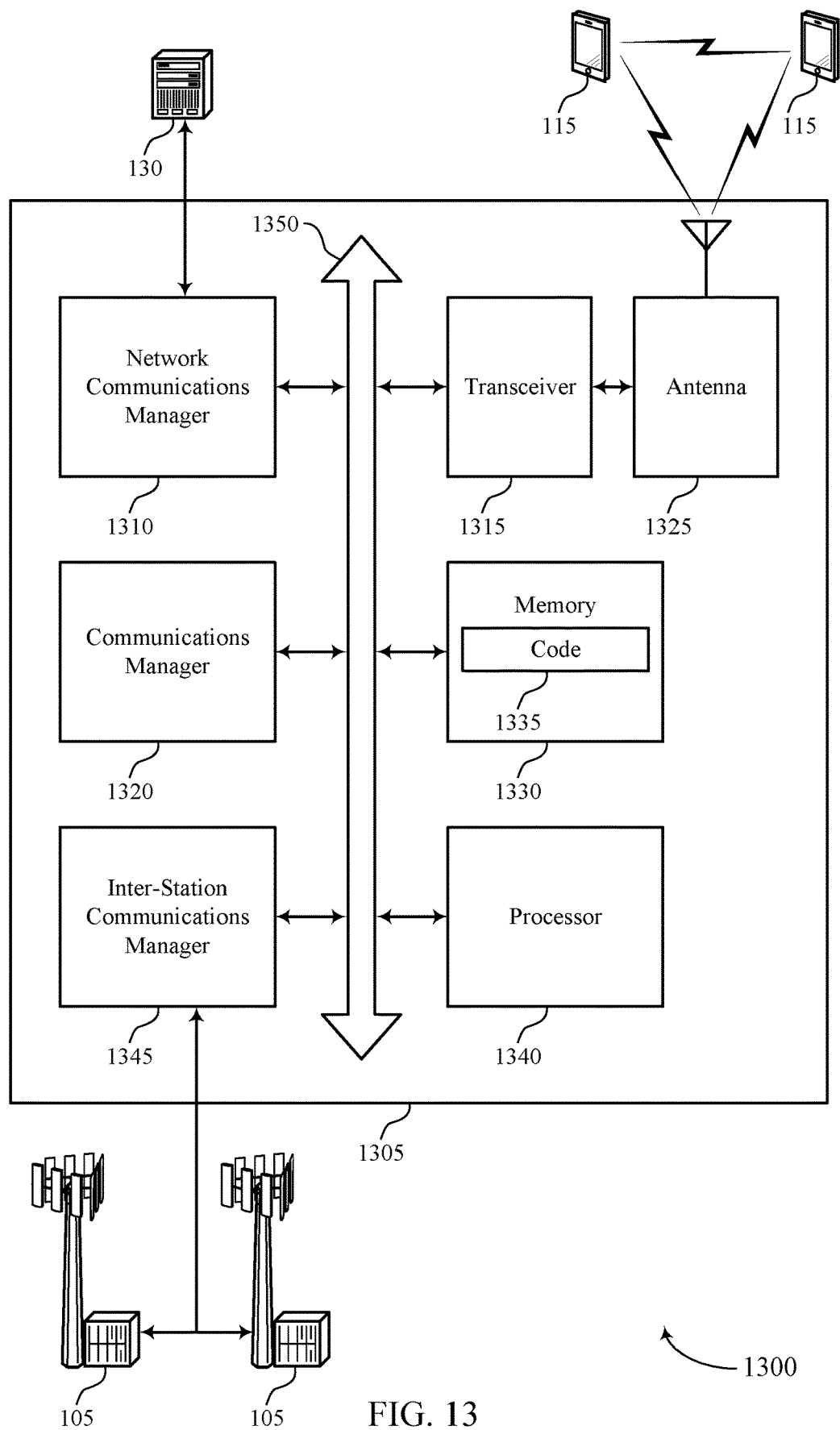
FIG. 13 shows a diagram of a system including a device that supports secondary cell dormancy for cross-carrier scheduling from a secondary cell in accordance with aspects of the present disclosure.

FIG. 13 shows a diagram of a system 1300 including a device 1305 that supports secondary cell dormancy for cross-carrier scheduling from a secondary cell in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting secondary cell dormancy for cross-carrier scheduling from a secondary cell). For example, the device 1305 or a component of the device 1305 may include a processor 1340 and memory 1330 coupled with the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station in accordance with examples as disclosed herein. For example, the communications manager 1320 may be configured as or otherwise support a means for transmitting, to a UE, control signaling identifying a configuration for bandwidth parts of a set of multiple cells that includes at least a primary cell and a secondary cell, where the secondary cell supports cross carrier scheduling of at least the primary cell in accordance with the configuration. The communications manager 1320 may be configured as or otherwise support a means for transmitting, to the UE on the secondary cell, a downlink control information message that includes a dormancy state indication for at least one cell of the set of multiple cells. The communications manager 1320 may be configured as or otherwise support a means for communicating, with the UE, on active bandwidth parts of the set of multiple cells based at least in part on the dormancy state indication for the at least one cell.

Additionally, or alternatively, the communications manager 1320 may support wireless communications at a base station in accordance with examples as disclosed herein. For example, the communications manager 1320 may be configured as or otherwise support a means for transmitting, to a UE, control signaling identifying a configuration for bandwidth parts of a set of multiple cells that include at least a primary cell and a secondary cell, where the secondary cell supports cross carrier scheduling of at least the primary cell in accordance with the configuration. The communications manager 1320 may be configured as or otherwise support a means for determining that the secondary cell is associated with a dormant bandwidth part. The communications manager 1320 may be configured as or otherwise support a means for transmitting, on the primary cell, a fallback downlink control information message based on the secondary cell being associated with the dormant bandwidth part. The communications manager 1320 may be configured as or otherwise support a means for switching to an active bandwidth part on the secondary cell based on transmitting the fallback downlink control information message.

By including or configuring the communications manager 1320 in accordance with examples as described herein, the device 1305 may support techniques for reduced power consumption and more efficient utilization of communication resources by supporting secondary cell dormancy indications by a secondary cell that is configured for cross-carrier scheduling. These techniques may reduce latency and improve user experience based on the efficient resource utilization and power saving techniques via cell dormancy.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of secondary cell dormancy for cross-carrier scheduling from a secondary cell as described herein, or the processor 1340 and the memory 1330 may be otherwise configured to perform or support such operations.

Figure 14:
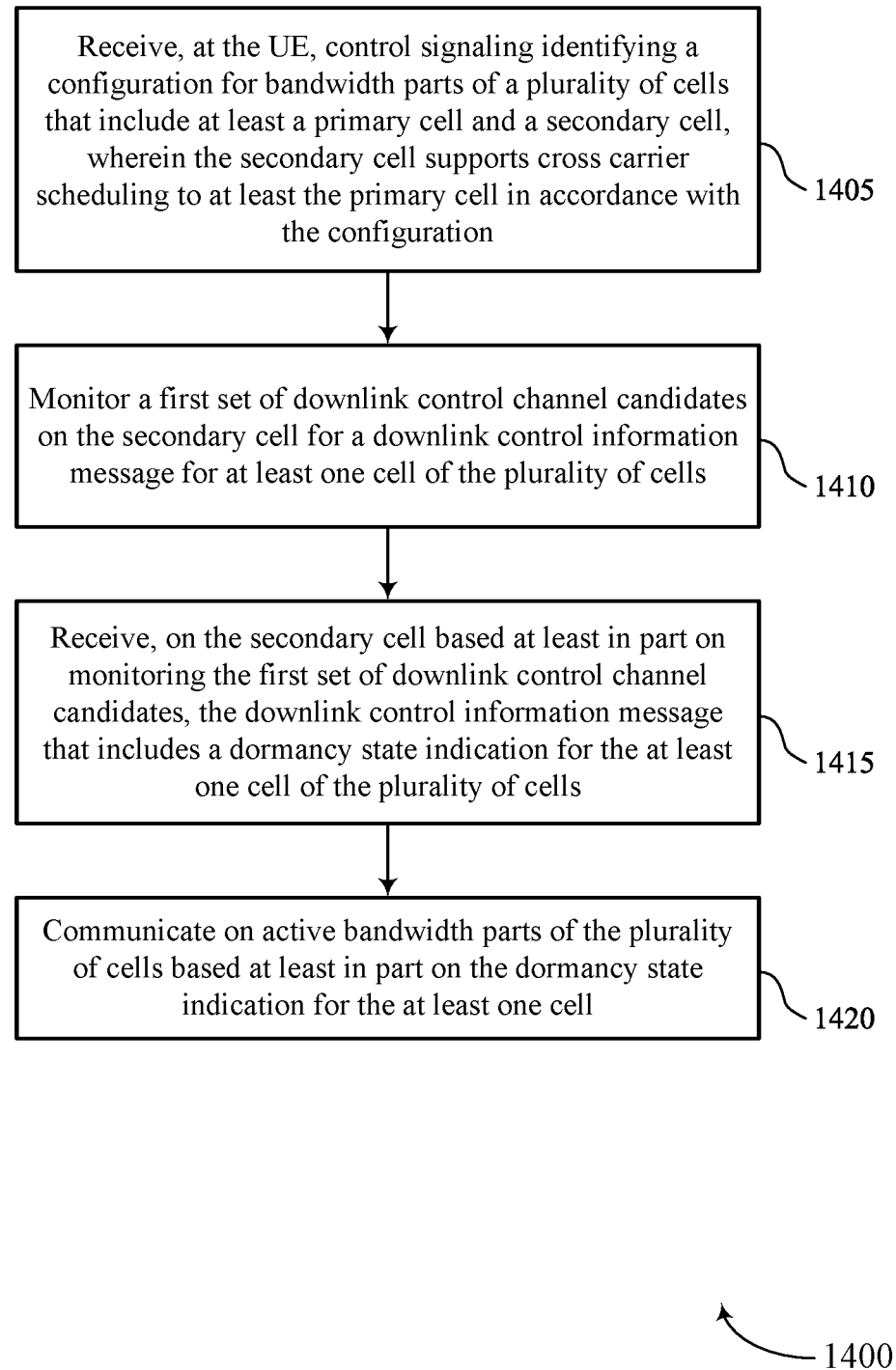
FIGS. 14 through 17 show flowcharts illustrating methods that support secondary cell dormancy for cross-carrier scheduling from a secondary cell in accordance with aspects of the present disclosure.

FIG. 14 shows a flowchart illustrating a method 1400 that supports secondary cell dormancy for cross-carrier scheduling from a secondary cell in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving, at the UE, control signaling identifying a configuration for bandwidth parts of a set of multiple cells that include at least a primary cell and a secondary cell, where the secondary cell supports cross carrier scheduling to at least the primary cell in accordance with the configuration. The operations of 1405 may be performed in accordance with examples as disclosed herein. In some examples, aspects of the operations of 1405 may be performed by a control message interface 825 as described with reference to FIG. 8.

At 1410, the method may include monitoring a first set of downlink control channel candidates on the secondary cell for a downlink control information message for at least one cell of the set of multiple cells. The operations of 1410 may be performed in accordance with examples as disclosed herein. In some examples, aspects of the operations of 1410 may be performed by a PDCCH monitoring component 830 as described with reference to FIG. 8.

At 1415, the method may include receiving, on the secondary cell based on monitoring the first set of downlink control channel candidates, the downlink control information message that includes a dormancy state indication for the at least one cell of the set of multiple cells. The operations of 1415 may be performed in accordance with examples as disclosed herein. In some examples, aspects of the operations of 1415 may be performed by a DCI interface 835 as described with reference to FIG. 8.

At 1420, the method may include communicating on active bandwidth parts of the set of multiple cells based on the dormancy state indication for the at least one cell. The operations of 1420 may be performed in accordance with examples as disclosed herein. In some examples, aspects of the operations of 1420 may be performed by a communication interface 840 as described with reference to FIG. 8.

Figure 15:
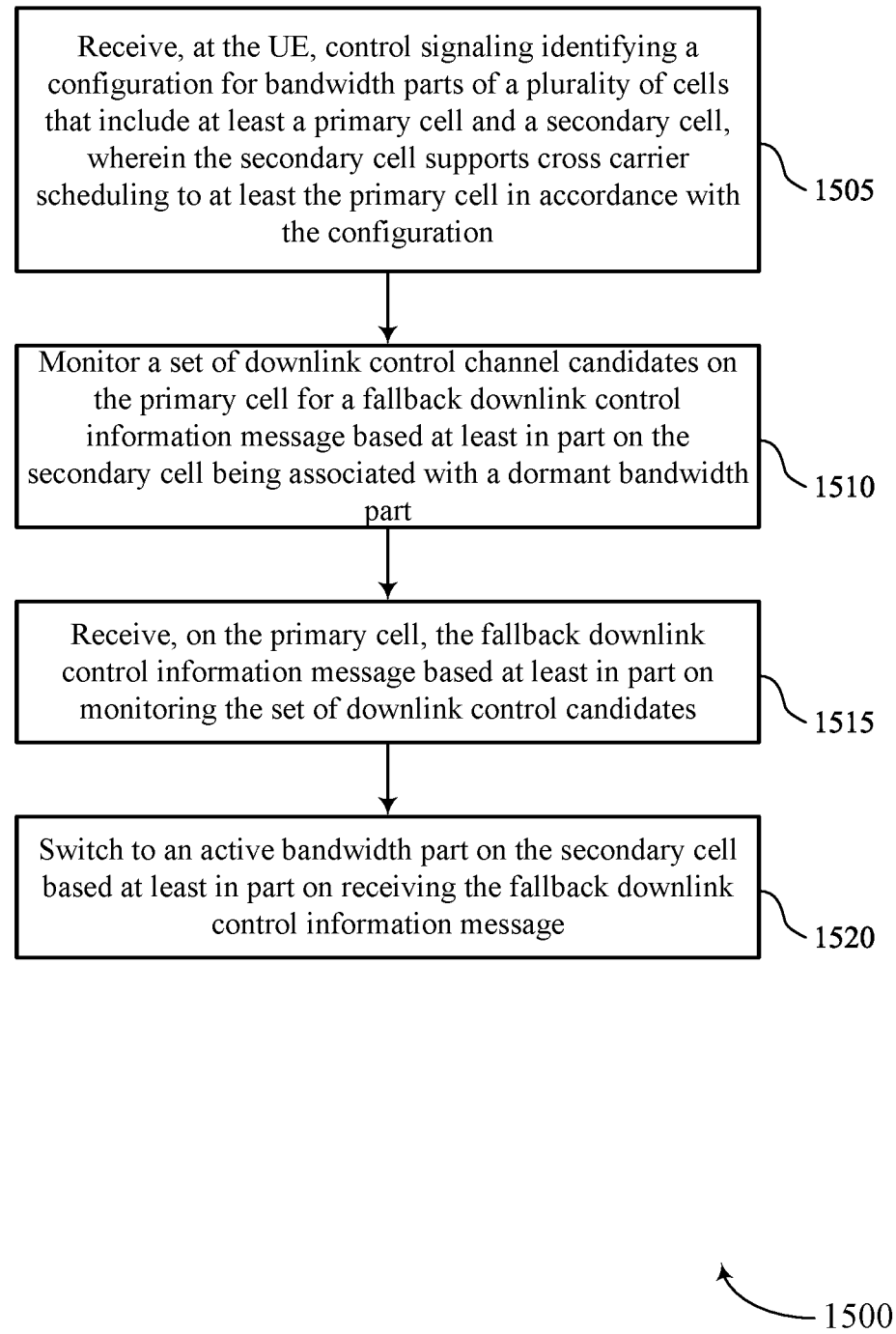

FIG. 15 shows a flowchart illustrating a method 1500 that supports secondary cell dormancy for cross-carrier scheduling from a secondary cell in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving, at the UE, control signaling identifying a configuration for bandwidth parts of a set of multiple cells that include at least a primary cell and a secondary cell, where the secondary cell supports cross carrier scheduling to at least the primary cell in accordance with the configuration. The operations of 1505 may be performed in accordance with examples as disclosed herein. In some examples, aspects of the operations of 1505 may be performed by a control message interface 825 as described with reference to FIG. 8.

At 1510, the method may include monitoring a set of downlink control channel candidates on the primary cell for a fallback downlink control information message based on the secondary cell being associated with a dormant bandwidth part. The operations of 1510 may be performed in accordance with examples as disclosed herein. In some examples, aspects of the operations of 1510 may be performed by a PDCCH monitoring component 830 as described with reference to FIG. 8.

At 1515, the method may include receiving, on the primary cell, the fallback downlink control information message based on monitoring the set of downlink control candidates. The operations of 1515 may be performed in accordance with examples as disclosed herein. In some examples, aspects of the operations of 1515 may be performed by a DCI interface 835 as described with reference to FIG. 8.

At 1520, the method may include switching to an active bandwidth part on the secondary cell based on receiving the fallback downlink control information message. The operations of 1520 may be performed in accordance with examples as disclosed herein. In some examples, aspects of the operations of 1520 may be performed by a BWP component 845 as described with reference to FIG. 8.

Figure 16:
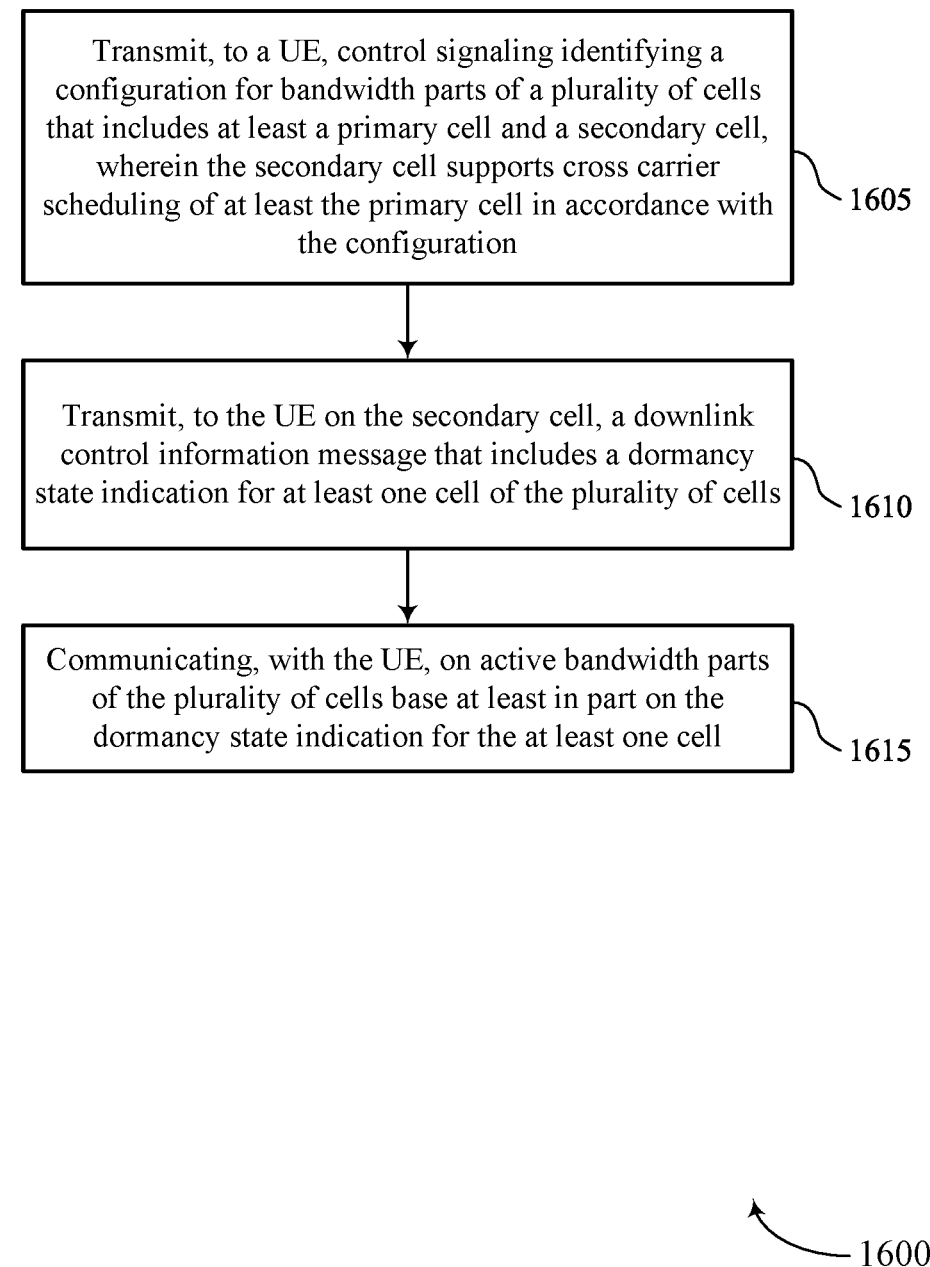

FIG. 16 shows a flowchart illustrating a method 1600 that supports secondary cell dormancy for cross-carrier scheduling from a secondary cell in accordance with aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally, or alternatively, the base station may perform aspects of the described functions using special-purpose hardware.

At 1605, the method may include transmitting, to a UE, control signaling identifying a configuration for bandwidth parts of a set of multiple cells that includes at least a primary cell and a secondary cell, where the secondary cell supports cross carrier scheduling of at least the primary cell in accordance with the configuration. The operations of 1605 may be performed in accordance with examples as disclosed herein. In some examples, aspects of the operations of 1605 may be performed by a control message interface 1225 as described with reference to FIG. 12.

At 1610, the method may include transmitting, to the UE on the secondary cell, a downlink control information message that includes a dormancy state indication for at least one cell of the set of multiple cells. The operations of 1610 may be performed in accordance with examples as disclosed herein. In some examples, aspects of the operations of 1610 may be performed by a DCI interface 1230 as described with reference to FIG. 12.

At 1615, the method may include communicating, with the UE, on active bandwidth parts of the set of multiple cells based on the dormancy state indication for the at least one cell. The operations of 1615 may be performed in accordance with examples as disclosed herein. In some examples, aspects of the operations of 1615 may be performed by a communication interface 1235 as described with reference to FIG. 12.

Figure 17:
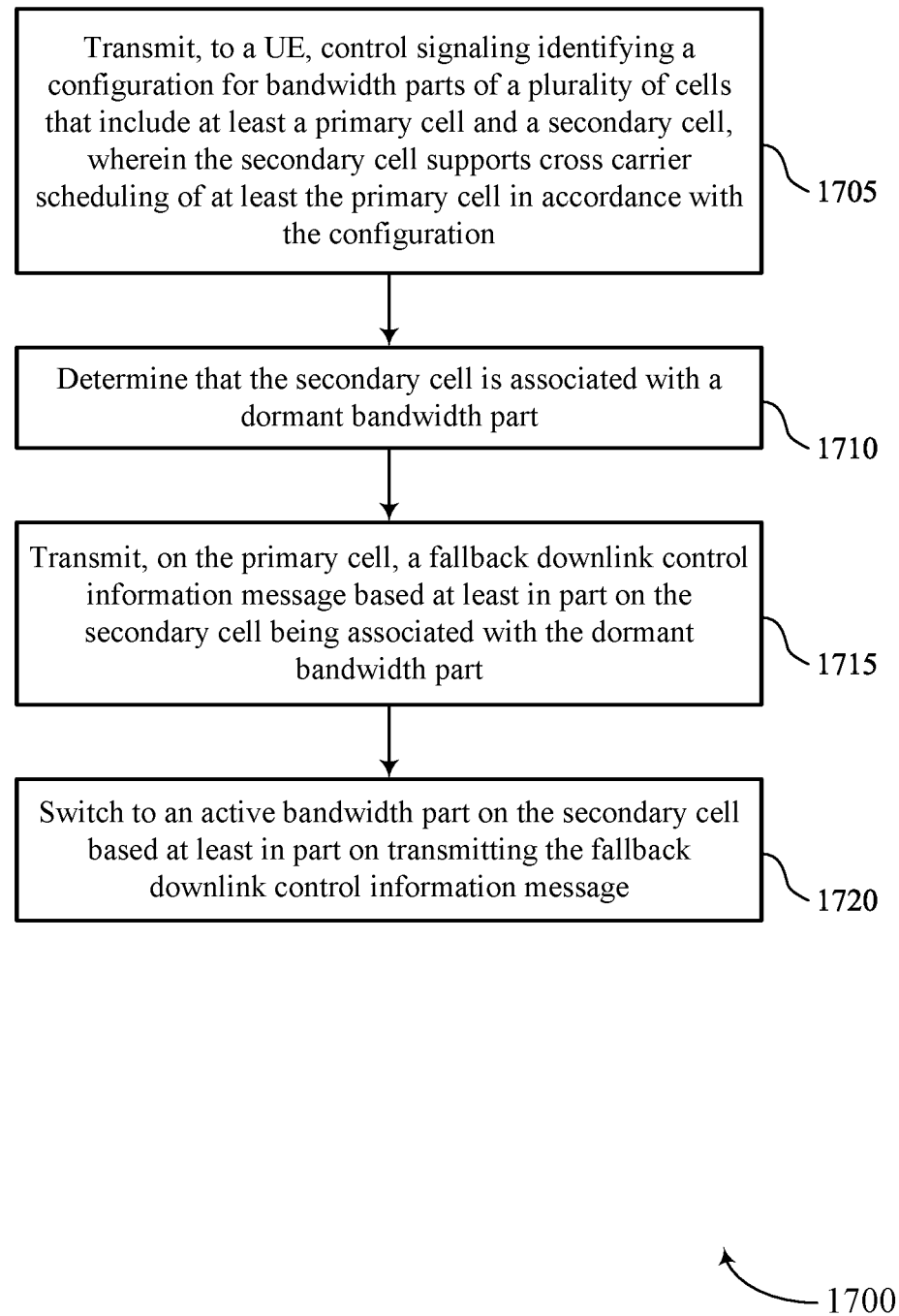

FIG. 17 shows a flowchart illustrating a method 1700 that supports secondary cell dormancy for cross-carrier scheduling from a secondary cell in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally, or alternatively, the base station may perform aspects of the described functions using special-purpose hardware.

At 1705, the method may include transmitting, to a UE, control signaling identifying a configuration for bandwidth parts of a set of multiple cells that include at least a primary cell and a secondary cell, where the secondary cell supports cross carrier scheduling of at least the primary cell in accordance with the configuration. The operations of 1705 may be performed in accordance with examples as disclosed herein. In some examples, aspects of the operations of 1705 may be performed by a control message interface 1225 as described with reference to FIG. 12.

At 1710, the method may include determining that the secondary cell is associated with a dormant bandwidth part. The operations of 1710 may be performed in accordance with examples as disclosed herein. In some examples, aspects of the operations of 1710 may be performed by a BWP component 1240 as described with reference to FIG. 12.

At 1715, the method may include transmitting, on the primary cell, a fallback downlink control information message based on the secondary cell being associated with the dormant bandwidth part. The operations of 1715 may be performed in accordance with examples as disclosed herein. In some examples, aspects of the operations of 1715 may be performed by a DCI interface 1230 as described with reference to FIG. 12.

At 1720, the method may include switching to an active bandwidth part on the secondary cell based on transmitting the fallback downlink control information message. The operations of 1720 may be performed in accordance with examples as disclosed herein. In some examples, aspects of the operations of 1720 may be performed by a BWP switching component 1245 as described with reference to FIG. 12.

The following provides an overview of aspects of the present disclosure:

Aspect 1: A method for wireless communications at a user equipment (UE), comprising: receiving, at the UE, control signaling identifying a configuration for bandwidth parts of a plurality of cells that include at least a primary cell and a secondary cell, wherein the secondary cell supports cross carrier scheduling to at least the primary cell in accordance with the configuration; monitoring a first set of downlink control channel candidates on the secondary cell for a downlink control information message for at least one cell of the plurality of cells; receiving, on the secondary cell based at least in part on monitoring the first set of downlink control channel candidates, the downlink control information message that includes a dormancy state indication for the at least one cell of the plurality of cells; and communicating on active bandwidth parts of the plurality of cells based at least in part on the dormancy state indication for the at least one cell.

Aspect 2: The method of aspect 1, further comprising: determining that the downlink control information message includes the dormancy state indication based at least in part on a value of a cell indicator field of the downlink control information message.

Aspect 3: The method of aspect 2, further comprising: receiving an indication of a downlink control configuration that specifies that the dormancy state indication is to be included in downlink control information messages that schedule a cell associated with the value of the cell indicator field, wherein the UE determines the downlink control information message includes the dormancy state indication based at least in part on the received downlink control configuration.

Aspect 4: The method of any of aspects 1 through 3, wherein the downlink control information message is a first downlink control information message, further comprising: monitoring a second set of downlink control channel candidates of a UE specific search space on the primary cell for a second downlink control information message; and receiving, based at least in part on monitoring the second set of downlink control channel candidates, the second downlink control information message including the dormancy state indication for the at least one cell.

Aspect 5: The method of aspect 4, further comprising: determining that the second downlink control information message includes a value of a cell indicator field of zero, or a same value that is included in the cell indicator field of the first downlink control information message.

Aspect 6: The method of any of aspect 4, further comprising: determining that the second downlink control information message lacks a cell indicator field based at least in part on the second downlink control information message being received on the primary cell.

Aspect 7: The method of any of aspects 1 through 6, further comprising: receiving a semi-static configuration that specifies that the secondary cell is to transmit the downlink control information message that includes the dormancy state indication, wherein the first set of downlink control channel candidates are monitored for the downlink control information message including the dormancy state indication based at least in part on the semi-static configuration.

Aspect 8: The method of any of aspects 1 through 7, wherein the downlink control information message is a non-fallback downlink control information message, further comprising: determining that the secondary cell is associated with a dormant bandwidth part based at least in part on the dormancy indication; monitoring a second set of downlink control channel candidates on the primary cell for a fallback downlink control information message based at least in part on the secondary cell being associated with the dormant bandwidth part; receiving, on the primary cell, the fallback downlink control information message based at least in part on monitoring the second set of downlink control candidates; and switching to an active bandwidth part on the secondary cell based at least in part on receiving the fallback downlink control information message.

Aspect 9: The method of aspect 8, wherein receiving the fallback downlink control information message comprises: receiving the fallback downlink control information message that includes an indication to switch to the active bandwidth part on the secondary cell, wherein the UE switches to the active bandwidth part based at least in part on the indication.

Aspect 10: The method of any of aspects 8 through 9, wherein the non-fallback downlink control information message is a DCI format 1_1, or a DCI format 0_1, or a DCI format 1_2, or a DCI format 0_2 and the fallback downlink control information message is a DCI format 1_0 or a DCI format 0_0.

Aspect 11: The method of any of aspects 1 through 10, wherein receiving the downlink control information message comprises: receiving the downlink control information message that schedules a resource for communication in the primary cell, the secondary cell, or another secondary cell of the plurality of cells.

Aspect 12: The method of any of aspects 1 through 11, further comprising: performing blind decoding on the first set of downlink control channel candidates of a UE specific search space set of the secondary cell, wherein the downlink control information message is received based at least in part on the blind decoding.

Aspect 13: A method for wireless communications at a UE, comprising: receiving, at the UE, control signaling identifying a configuration for bandwidth parts of a plurality of cells that include at least a primary cell and a secondary cell, wherein the secondary cell supports cross carrier scheduling to at least the primary cell in accordance with the configuration; monitoring a set of downlink control channel candidates on the primary cell for a fallback downlink control information message based at least in part on the secondary cell being associated with a dormant bandwidth part; receiving, on the primary cell, the fallback downlink control information message based at least in part on monitoring the set of downlink control candidates; and switching to an active bandwidth part on the secondary cell based at least in part on receiving the fallback downlink control information message.

Aspect 14: The method of aspect 13, wherein the set of downlink control channel candidates is a first set of downlink control channel candidates, further comprising: monitoring a second set of downlink control channel candidates on the secondary cell for a downlink control information message for at least one cell of the plurality of cells; receiving, on the secondary cell based at least in part on monitoring the second set of downlink control channel candidates, the downlink control information message that includes a dormancy state indication for the at least one cell of the plurality of cells; and communicating on active bandwidth parts of the plurality of cells based at least in part on the dormancy state indication for the at least one cell.

Aspect 15: The method of aspect 14, wherein the downlink control information message is a DCI format 1_1, or a DCI format 0_1, or a DCI format 1_2, or a DCI format 0_2 and the fallback downlink control information message is a DCI format 1_0 or a DCI format 0_0.

Aspect 16: The method of any of aspects 13 through 15, wherein receiving the fallback downlink control information message comprises: receiving the fallback downlink control information message that includes an indication to switch to the active bandwidth part on the secondary cell, wherein the UE switches to the active bandwidth part based at least in part on the indication.

Aspect 17: A method for wireless communications at a base station, comprising: transmitting, to a UE, control signaling identifying a configuration for bandwidth parts of a plurality of cells that includes at least a primary cell and a secondary cell, wherein the secondary cell supports cross carrier scheduling of at least the primary cell in accordance with the configuration; transmitting, to the UE on the secondary cell, a downlink control information message that includes a dormancy state indication for at least one cell of the plurality of cells; and communicating, with the UE, on active bandwidth parts of the plurality of cells based at least in part on the dormancy state indication for the at least one cell.

Aspect 18: The method of aspect 17, further comprising: including the dormancy state indication in the downlink control information message based at least in part on a value of a cell indicator field of the downlink control information message.

Aspect 19: The method of aspect 18, further comprising: transmitting an indication of a downlink control configuration that specifies that the dormancy state indication is to be included in downlink control information messages that schedule a cell associated with the value of the cell indicator field, wherein the dormancy state indication is included in the downlink control information message based at least in part on the downlink control configuration.

Aspect 20: The method of any of aspects 17 through 19, wherein the downlink control information message is a first downlink control information message, further comprising: transmitting, on the primary cell, a second downlink control information message including the dormancy state indication for the at least one cell.

Aspect 21: The method of aspect 20, further comprising: including, in the second downlink control information message, a value of a cell indicator field of zero, or a same value that is included in the cell indicator field of the first downlink control information message based at least in part on the second downlink control information message including the dormancy state indication and being transmitted on the primary cell.

Aspect 22: The method of aspect 20, wherein transmitting the second downlink control information message comprises: transmitting the second downlink control information message without a cell indicator field based at least in part on the second downlink control information message including the dormancy state indication and being transmitted on the primary cell.

Aspect 23: The method of any of aspects 17 through 22, further comprising: transmitting, to the UE, a semi-static configuration that specifies that the secondary cell is to transmit the downlink control information message that includes the dormancy state indication, wherein the downlink control information message including the dormancy state indication is transmitted on the secondary cell based at least in part on the semi-static configuration.

Aspect 24: The method of any of aspects 17 through 23, wherein the downlink control information message is a non-fallback downlink control information message, further comprising: determining that the secondary cell is associated with a dormant bandwidth part based at least in part on the dormancy indication; transmitting, on the primary cell, a fallback downlink control information message based at least in part on the secondary cell being associated with the dormant bandwidth part; and determining that the secondary cell is switched to an active bandwidth part based at least in part on transmitting the fallback downlink control information message.

Aspect 25: The method of aspect 24, wherein transmitting the fallback downlink control information message comprises: transmitting the fallback downlink control information message that includes an indication to switch to the active bandwidth part on the secondary cell.

Aspect 26: The method of any of aspects 24 through 25, wherein the non-fallback downlink control information message is a DCI format 1_1 or a DCI format 0_1 and the fallback downlink control information message is a DCI format 1_0 or a DCI format 0_0.

Aspect 27: The method of any of aspects 17 through 26, wherein transmitting the downlink control information message comprises: transmitting the downlink control information message that schedules a resource for communication in the primary cell, the secondary cell, or another secondary cell of the plurality of cells.

Aspect 28: The method of any of aspects 17 through 27, wherein transmitting the downlink control information message comprises: transmitting the downlink control information message in a UE specific search space set of the secondary cell.

Aspect 29: A method for wireless communications at a base station, comprising: transmitting, to a UE, control signaling identifying a configuration for bandwidth parts of a plurality of cells that include at least a primary cell and a secondary cell, wherein the secondary cell supports cross carrier scheduling of at least the primary cell in accordance with the configuration; determining that the secondary cell is associated with a dormant bandwidth part; transmitting, on the primary cell, a fallback downlink control information message based at least in part on the secondary cell being associated with the dormant bandwidth part; and switching to an active bandwidth part on the secondary cell based at least in part on transmitting the fallback downlink control information message.

Aspect 30: The method of aspect 29, further comprising: transmitting, on the secondary cell, a downlink control information message that includes a dormancy state indication for the at least one cell of the plurality of cells; and communicating on active bandwidth parts of the plurality of cells based at least in part on the dormancy state indication for the at least one cell.

Aspect 31: The method of aspect 30, wherein the downlink control information message is a DCI format 1_1 or a DCI format 0_1 and the fallback downlink control information message is a DCI format 1_0 or a DCI format 0_0.

Aspect 32: The method of any of aspects 29 through 31, wherein transmitting the fallback downlink control information message comprises: transmitting the fallback downlink control information message that includes an indication to switch to the active bandwidth part on the secondary cell.

Aspect 33: An apparatus for wireless communications at a user equipment (UE), comprising a processor; memory coupled with the processor; and instructions stored in the memory and executable by the processor to cause the apparatus to perform a method of any of aspects 1 through 12.

Aspect 34: An apparatus for wireless communications at a user equipment (UE), comprising at least one means for performing a method of any of aspects 1 through 12.

Aspect 35: A non-transitory computer-readable medium storing code for wireless communications at a user equipment (UE), the code comprising instructions executable by a processor to perform a method of any of aspects 1 through 12.

Aspect 36: An apparatus for wireless communications at a UE, comprising a processor; memory coupled with the processor; and instructions stored in the memory and executable by the processor to cause the apparatus to perform a method of any of aspects 13 through 16.

Aspect 37: An apparatus for wireless communications at a UE, comprising at least one means for performing a method of any of aspects 13 through 16.

Aspect 38: A non-transitory computer-readable medium storing code for wireless communications at a UE, the code comprising instructions executable by a processor to perform a method of any of aspects 13 through 16.

Aspect 39: An apparatus for wireless communications at a network node, comprising a processor; memory coupled with the processor; and instructions stored in the memory and executable by the processor to cause the apparatus to perform a method of any of aspects 17 through 28.

Aspect 40: An apparatus for wireless communications at a network node, comprising at least one means for performing a method of any of aspects 17 through 28.

Aspect 41: A non-transitory computer-readable medium storing code for wireless communications at a network node, the code comprising instructions executable by a processor to perform a method of any of aspects 17 through 28.

Aspect 42: An apparatus for wireless communications at a network node, comprising a processor; memory coupled with the processor; and instructions stored in the memory and executable by the processor to cause the apparatus to perform a method of any of aspects 29 through 32.

Aspect 43: An apparatus for wireless communications at a network node, comprising at least one means for performing a method of any of aspects 29 through 32.

Aspect 44: A non-transitory computer-readable medium storing code for wireless communications at a network node, the code comprising instructions executable by a processor to perform a method of any of aspects 29 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
    one or more processors;
    memory coupled with the one or more processors; and
    instructions stored in the memory and executable by the one or more processors to cause the apparatus to:
        receive, at the UE, control signaling identifying a configuration for bandwidth parts of a plurality of cells that include at least a primary cell and a secondary cell, wherein the secondary cell supports cross carrier scheduling, the cross carrier scheduling referring to a capability of the secondary cell to carry downlink control information scheduling the primary cell;
        receive, via higher-layer signaling, an indication that specifies that dormancy state indications are to be included in downlink control information messages comprising cell indicator fields having a zero value;
        monitor a first set of downlink control channel candidates on the secondary cell for a downlink control information message for at least one cell of the plurality of cells;
        receive, on the secondary cell based at least in part on the secondary cell supporting the cross carrier scheduling and monitoring the first set of downlink control channel candidates, the downlink control information message that includes a cell indicator field that has the zero value, wherein the downlink control information message further includes a dormancy state indication for the at least one cell of the plurality of cells based at least in part on the higher-layer signaling and the cell indicator field having the zero value; and
        communicate on active bandwidth parts of the plurality of cells based at least in part on the dormancy state indication for the at least one cell.

2. The apparatus of claim 1, wherein the instructions are further executable by the one or more processors to:
    monitor a second set of downlink control channel candidates of a UE specific search space on the primary cell for a second downlink control information message; and
    receive, based at least in part on monitoring the second set of downlink control channel candidates, the second downlink control information message including the dormancy state indication for the at least one cell.

3. The apparatus of claim 2, wherein the instructions are further executable by the one or more processors to:
    determine that the second downlink control information message includes a second value of a second cell indicator field of zero, or a value that is included in the cell indicator field of the downlink control information message.

4. The apparatus of claim 2, wherein the instructions are further executable by the one or more processors to:
    determine that the second downlink control information message lacks a second cell indicator field based at least in part on the second downlink control information message being received on the primary cell.

5. The apparatus of claim 1, wherein the instructions are further executable by the one or more processors to:
    receive a semi-static configuration that specifies that the secondary cell is to transmit the downlink control information message that includes the dormancy state indication, wherein the first set of downlink control channel candidates are monitored for the downlink control information message including the dormancy state indication based at least in part on the semi-static configuration.

6. The apparatus of claim 1, wherein the downlink control information message is a non-fallback downlink control information message and wherein the instructions are further executable by the one or more processors to cause the apparatus to:
    determine that the secondary cell is associated with a dormant bandwidth part based at least in part on the dormancy state indication;
    monitor a second set of downlink control channel candidates on the primary cell for a fallback downlink control information message based at least in part on the secondary cell being associated with the dormant bandwidth part;
    receive, on the primary cell, a fallback downlink control information message based at least in part on monitoring the second set of downlink control channel candidates; and
    switch to an active bandwidth part on the secondary cell based at least in part on receiving the fallback downlink control information message.

7. The apparatus of claim 6, wherein the instructions are further executable by the one or more processors to receive the fallback downlink control information message by being executable by the one or more processors to:
    receive the fallback downlink control information message that includes an indication to switch to the active bandwidth part on the secondary cell, wherein the UE switches to the active bandwidth part based at least in part on the indication.

8. The apparatus of claim 6, wherein the non-fallback downlink control information message is a DCI format 1_1, or a DCI format 0_1, or a DCI format 1_2, or a DCI format 0_2 and the fallback downlink control information message is a DCI format 1_0 or a DCI format 0_0.

9. The apparatus of claim 1, wherein the instructions are further executable by the one or more processors to receive the downlink control information message by being executable by the one or more processors to:
receive the downlink control information message that schedules a resource for communication in the primary cell, the secondary cell, or another secondary cell of the plurality of cells.

10. The apparatus of claim 1, wherein the instructions are further executable by the one or more processors to:
perform blind decoding on the first set of downlink control channel candidates of a UE specific search space set of the secondary cell, wherein the downlink control information message is received based at least in part on the blind decoding.

11. The apparatus of claim 1, wherein the downlink control information message received on the secondary cell includes the dormancy state indication is downlink control information format 1_1, downlink control information format 0_1, or downlink control information format 2_6.

12. A method for wireless communications at a user equipment (UE), comprising:
receiving, at the UE, control signaling identifying a configuration for bandwidth parts of a plurality of cells that include at least a primary cell and a secondary cell, wherein the secondary cell supports cross carrier scheduling, the cross carrier scheduling referring to a capability of the secondary cell to carry downlink control information scheduling the primary cell;
receiving, via higher-layer signaling, an indication that specifies that dormancy state indications are to be included in downlink control information messages comprising cell indicator fields having a zero value;
monitoring a first set of downlink control channel candidates on the secondary cell for a downlink control information message for at least one cell of the plurality of cells;
receiving, on the secondary cell based at least in part on the secondary cell supporting the cross carrier scheduling and monitoring the first set of downlink control channel candidates, the downlink control information message that includes a cell indicator field that has the zero value, wherein the downlink control information message further includes a dormancy state indication for the at least one cell of the plurality of cells based at least in part on the higher-layer signaling and the cell indicator field having the zero value; and
communicating on active bandwidth parts of the plurality of cells based at least in part on the dormancy state indication for the at least one cell.

13. An apparatus for wireless communications at a network node, comprising:
one or more processors;
memory coupled with the one or more processors; and
instructions stored in the memory and executable by the one or more processors to cause the apparatus to:
transmit, to a user equipment (UE), control signaling identifying a configuration for bandwidth parts of a plurality of cells that includes at least a primary cell and a secondary cell, wherein the secondary cell supports cross carrier scheduling, the cross carrier scheduling referring to a capability of the secondary cell to carry downlink control information scheduling the primary cell;
transmit, via higher-layer signaling, an indication that specifies that dormancy state indications are to be included in downlink control information messages comprising cell indicator fields having a zero value;
transmit, to the UE on the secondary cell and based at least in part on the secondary cell supporting the cross carrier scheduling, a downlink control information message that includes a cell indicator field that has the zero value, wherein the downlink control information message further includes a dormancy state indication for at least one cell of the plurality of cells based at least in part on the higher-layer signaling and the cell indicator field having the zero value; and
communicate, with the UE, on active bandwidth parts of the plurality of cells based at least in part on the dormancy state indication for the at least one cell.

14. The apparatus of claim 13, wherein the instructions are further executable by the one or more processors to:
transmit, on the primary cell, a second downlink control information message including the dormancy state indication for the at least one cell.

15. The apparatus of claim 14, wherein the instructions are further executable by the one or more processors to:
include, in the second downlink control information message, a second value of a second cell indicator field of zero, or a value that is included in the cell indicator field of the downlink control information message based at least in part on the second downlink control information message including the dormancy state indication and being transmitted on the primary cell.

16. The apparatus of claim 14, wherein the instructions to transmit the second downlink control information message are executable by the one or more processors to:
transmit the second downlink control information message without a second cell indicator field based at least in part on the second downlink control information message including the dormancy state indication and being transmitted on the primary cell.

17. The apparatus of claim 13, wherein the instructions are further executable by the one or more processors to:
transmit, to the UE, a semi-static configuration that specifies that the secondary cell is to transmit the downlink control information message that includes the dormancy state indication, wherein the downlink control information message including the dormancy state indication is transmitted on the secondary cell based at least in part on the semi-static configuration.

18. The apparatus of claim 13, wherein the downlink control information message is a non-fallback downlink control information message and wherein the instructions are further executable by the one or more processors to:
determine that the secondary cell is associated with a dormant bandwidth part based at least in part on the dormancy state indication;
transmit, on the primary cell, a fallback downlink control information message based at least in part on the secondary cell being associated with the dormant bandwidth part; and
determine that the secondary cell is switched to an active bandwidth part based at least in part on transmitting the fallback downlink control information message.

19. The apparatus of claim 18, wherein the instructions are further executable by the one or more processors to transmit the fallback downlink control information message by being executable by the one or more processors to cause the apparatus to:

transmit the fallback downlink control information message that includes an indication to switch to the active bandwidth part on the secondary cell.

20. The apparatus of claim 18, wherein the non-fallback downlink control information message is a DCI format 1_1 or a DCI format 0_1 and the fallback downlink control information message is a DCI format 1_0 or a DCI format 0_0.

21. The apparatus of claim 13, wherein the instructions are further executable by the one or more processors to transmit the downlink control information message by being executable by the one or more processors to:

transmit the downlink control information message that schedules a resource for communication in the primary cell, the secondary cell, or another secondary cell of the plurality of cells.

22. The apparatus of claim 13, wherein the instructions are further executable by the one or more processors to transmit the downlink control information message by being executable by the one or more processors to:

transmit the downlink control information message in a UE specific search space set of the secondary cell.

23. A method for wireless communications at a network node, comprising:

transmitting, to a user equipment (UE), control signaling identifying a configuration for bandwidth parts of a plurality of cells that includes at least a primary cell and a secondary cell, wherein the secondary cell supports cross carrier scheduling, the cross carrier scheduling referring to a capability of the secondary cell to carry downlink control information scheduling the primary cell;

transmitting, via higher-layer signaling, an indication that specifies that dormancy state indications are to be included in downlink control information messages comprising cell indicator fields having a zero value;

transmitting, to the UE on the secondary cell and based at least in part on the secondary cell supporting the cross carrier scheduling, a downlink control information message that includes a cell indicator field that has the zero value, wherein the downlink control information message further includes a dormancy state indication for at least one cell of the plurality of cells based at least in part on the higher-layer signaling and the cell indicator field having the zero value; and communicating, with the UE, on active bandwidth parts of the plurality of cells based at least in part on the dormancy state indication for the at least one cell.

* * * * *